(12) United States Patent
Uehira et al.

(10) Patent No.: US 10,899,882 B2
(45) Date of Patent: Jan. 26, 2021

(54) PHASE DIFFERENCE FILM

(71) Applicant: FUJIFILM Corporation, Tokyo (JP)

(72) Inventors: Shigeki Uehira, Kanagawa (JP);
Naoyuki Morooka, Kanagawa (JP);
Takafumi Nakayama, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/718,598

(22) Filed: Dec. 18, 2019

(65) Prior Publication Data

US 2020/0131309 A1     Apr. 30, 2020

Related U.S. Application Data

(63) Continuation of application No. PCT/JP2018/024351, filed on Jun. 27, 2018.

(30) Foreign Application Priority Data

Jun. 28, 2017   (JP) ................ 2017-126231

(51) Int. Cl.
| | |
|---|---|
| *C08G 64/04* | (2006.01) |
| *C08G 64/16* | (2006.01) |
| *G02B 5/30* | (2006.01) |
| *G02F 1/13363* | (2006.01) |

(52) U.S. Cl.
CPC ............. *C08G 64/04* (2013.01); *C08G 64/16* (2013.01); *G02B 5/3083* (2013.01); *B32B 2457/202* (2013.01); *C09K 2323/03* (2020.08); *C09K 2323/035* (2020.08); *G02F 1/13363* (2013.01); *G02F 2001/133637* (2013.01)

(58) Field of Classification Search
CPC ...... C08G 64/04; C08G 64/045; C08G 64/16; C08G 64/1608; C08G 64/226; G02B 5/3016; G02B 5/3033; G02B 5/3083; C09K 2323/03; C09K 2323/035; B32B 2457/202; G02F 1/13363; G02F 2001/133637

See application file for complete search history.

(56) References Cited

U.S. PATENT DOCUMENTS

| | | | |
|---|---|---|---|
| 6,565,974 B1 * | 5/2003 | Uchiyama | G02B 1/10 428/412 |
| 6,638,582 B1 | 10/2003 | Uchiyama et al. | |
| 2003/0086027 A1 | 5/2003 | Uchiyama et al. | |
| 2013/0261283 A1 | 10/2013 | Motoyoshi et al. | |
| 2018/0355106 A1 * | 12/2018 | Morooka | C08G 64/24 |
| 2018/0362709 A1 * | 12/2018 | Uehira | C08G 64/24 |

FOREIGN PATENT DOCUMENTS

| | | | |
|---|---|---|---|
| JP | 3325560 B2 | 9/2002 | |
| JP | 4010810 B2 | 11/2007 | |
| JP | 2009-057322 A | 3/2009 | |
| JP | 4739636 B2 | 8/2011 | |
| JP | 5079150 B2 | 11/2012 | |
| JP | 5668077 B2 | 2/2015 | |
| JP | 5706071 B2 | 4/2015 | |
| JP | 2015-193809 A | 11/2015 | |
| WO | 2017/146022 A1 | 8/2017 | |
| WO | 2017/146023 A1 | 8/2017 | |
| WO | WO-2017146022 A1 * | 8/2017 | ............. C08G 64/08 |
| WO | WO-2017146023 A1 * | 8/2017 | ............. C08G 64/24 |

OTHER PUBLICATIONS

International Search Report issued in PCT/JP2018/024351 dated Sep. 11, 2018.
Written Opinion issued in PCT/JP2018/024351 dated Sep. 11, 2018.
International Preliminary Report on Patentability issued by WIPO dated Dec. 31, 2019, in connection with International Patent Application No. PCT/JP2018/024351.

* cited by examiner

*Primary Examiner* — Eli D. Strah
(74) *Attorney, Agent, or Firm* — Edwards Neils LLC; Jean C. Edwards, Esq.

(57) ABSTRACT

An object of the present invention is to provide a phase difference film that can exhibit sufficient reciprocal wavelength dispersibility. The present invention includes a copolymer containing at least one selected from a unit represented by Formula (1) and a unit represented by Formula (2), and a unit represented by Formula (3), in which 20 nm<Re (548)<300 nm, 0.5<Re (446)/Re (548)<1.0, and 1.0<Re (629)/Re (548)<2.0. Here, Re (446), Re (548), and Re (629) represent in-plane retardations at wavelengths of 446 nm, 548 nm, and 629 nm, respectively.

7 Claims, No Drawings

PHASE DIFFERENCE FILM

CROSS-REFERENCE TO RELATED APPLICATIONS

This application is a Continuation of PCT International Application No. PCT/JP2018/024351 filed on Jun. 27, 2018, which was published under PCT Article 21(2) in Japanese, and which claims priority under 35 U.S.C § 119(a) to Japanese Patent Application No. 2017-126231 filed on Jun. 28, 2017. The above applications are hereby expressly incorporated by reference, in their entirety, into the present application.

BACKGROUND OF THE INVENTION

1. Field of the Invention

The present invention relates to a phase difference film.

2. Description of the Related Art

In the related art, in a liquid crystal display device or the like, a phase difference film is used as an optical film.

As the phase difference film, a reverse dispersion film is known in which a phase difference increases as the wavelength increases. Examples of the component of the film constituting the reverse dispersion film include a positive intrinsic birefringence component (hereinafter, also referred to as a positive monomer component) that increases the refractive index in a direction parallel to the stretching direction of the film and a negative intrinsic birefringence component (hereinafter, also referred to as a negative monomer component) that increases the refractive index in a direction perpendicular to the stretching direction of the film. In the visible light wavelength range (about 400 nm to about 800 nm), the refractive index of the positive monomer component is larger than the refractive index of the negative monomer component, and the wavelength dispersion of the refractive index of the positive monomer component is smaller than the wavelength dispersion of the refractive index of the negative monomer component to form a reverse dispersion film. For this achievement, the negative monomer component is required to have an absorption maximum on the longer wavelength side than the positive monomer component.

As the negative monomer component, a component having a fluorene structure is known. For example, JP5079150B, JP5706071B, JP5668077B, JP4739636B, JP4010810B, and JP3325560B disclose phase difference films including a copolymer including a constitutional unit having a fluorene structure and a constitutional unit having alicyclic hydrocarbon or aromatic hydrocarbon. JP5079150B and JP5706071B disclose constitutional units derived from 9,9-bis[4-(2-hydroxyethoxy) phenyl] fluorene as a constitutional unit including a fluorene structure, and JP5668077B, JP4739636B, JP4010810B, and JP3325560B disclose constitutional units derived from 9,9-bis(4-hydroxyphenyl) fluorene.

SUMMARY OF THE INVENTION

However, in the phase difference film in the related art, the refractive index wavelength dispersion of the negative monomer component used is not sufficiently large, and the reciprocal wavelength dispersibility was not sufficiently exhibited in some cases. In order to solve such problems of the related art, the present inventors have made studies for the purpose of providing a phase difference film that can exhibit sufficient reciprocal wavelength dispersibility.

As a result of diligent research to solve the above problems, the present inventors have found that a phase difference film capable of exhibiting sufficient reciprocal wavelength dispersibility can be obtained by forming the phase difference film from a copolymer including a unit derived from a negative monomer component having a specific structure and a unit derived from a positive monomer component.

Specifically, the present invention has the following configuration.

[1] A phase difference film comprising: a copolymer containing at least one selected from a unit represented by Formula (1) and a unit represented by Formula (2), and a unit represented by Formula (3),
in which 20 nm<Re (548)<300 nm,
0.5<Re (446)/Re (548)<1.0, and
1.0<Re (629)/Re (548)<2.0;
here, Re (446), Re (548), and Re (629) represent in-plane retardation at respective wavelengths of 446 nm, 548 nm, and 629 nm;

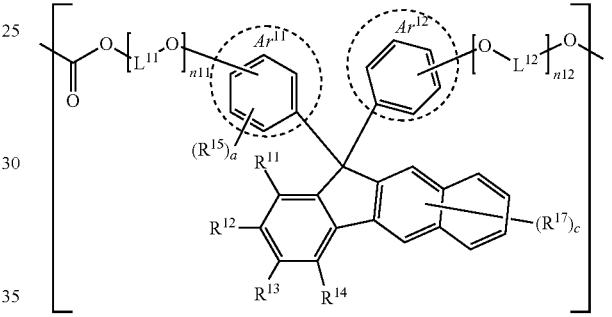

Formula (1)

in Formula (1), $R^{11}$ to $R^{14}$ each independently represent a hydrogen atom or a substituent having a Hammett substituent constant $\sigma_p$ value of less than −0.15, except for an aryl group, a heteroaryl group, and a substituent having a reactive group, and in $R^{11}$ to $R^{14}$, substituents adjacent to each other are not bonded to each other to form a fused ring; $R^{15}$ to $R^{17}$ each independently represent a substituent; a to c each independently represent an integer of 0 or more and represent an integer of the maximum number of substitution on each ring; in a case where a to c each are an integer of 2 or more, a plurality of $R^{15}$'s, a plurality of $R^{16}$'s, and a plurality of $R^{17}$'s may be identical to or different from each other;
$Ar^{11}$ and $Ar^{12}$ each independently represent an aryl group including a benzene ring surrounded by a broken line or a heteroaryl group including a benzene ring surrounded by a broken line, as one ring included in a fused ring;
$L^{11}$ and $L^{12}$ each independently represent an alkylene group having 2 to 8 carbon atoms, a cycloalkylene group having 5 to 12 carbon atoms, an arylene group having 6 to 20 carbon atoms, or a heteroarylene group having 6 to 20 carbon atoms;
n11 and n12 each independently represent an integer of 0 to 10; in a case where n11 and n12 are an integer of 2 to 10, a plurality of $L^{11}$'s and a plurality of $L^{12}$'s may be identical to or different from each other;
in a case where $Ar^{11}$ and $Ar^{12}$ each independently represent an aromatic fused ring group including a benzene ring surrounded by a broken line, $R^{15}$, $R^{16}$, —O-[$L^{11}$-O]$_{n11}$—, and —O-[$L^{12}$]$_{n12}$-O— each independently may be substituted at the benzene ring surrounded by a broken line and may be substituted at a ring included in a fused ring other than the benzene ring surrounded by a broken line;

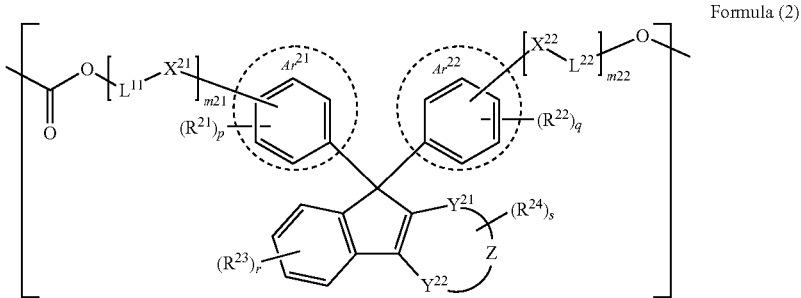

Formula (2)

in Formula (2), $Y^{21}$ and $Y^{22}$ each independently represent a carbon atom, an oxygen atom, a sulfur atom, or a nitrogen atom, and at least one $Y^{21}$ or $Y^{22}$ is an oxygen atom, a sulfur atom, or a nitrogen atom;

Z is an atomic group that forms a 5-membered to 7-membered ring with $Y^{21}$—C=C—$Y^{22}$, in which ring-constituting atoms of the atomic group includes a carbon atom, an oxygen atom, a sulfur atom, or a nitrogen atom;

$R^{21}$ to $R^{24}$ each independently represent a substituent;

p to s each independently represent an integer of 0 or more and represent an integer of equal to or less than the maximum number of substitution on each ring; in a case where p to s each are an integer of 2 or more, a plurality of $R^{21}$'s, a plurality of $R^{21}$'s, a plurality of $R^{22}$'s, a plurality of $R^{23}$'s, and a plurality of $R^{24}$'s may be identical to or different from each other;

$Ar^{21}$ and $Ar^{22}$ each independently represent an aryl group including a benzene ring surrounded by a broken line or a heteroaryl group including a benzene ring surrounded by a broken line, as one ring included in a fused ring;

$X^{21}$ and $X^{22}$ each independently is a group selected from a single bond, —O—, and —S—;

$L^{21}$ and $L^{22}$ each independently represent an alkylene group having 2 to 8 carbon atoms, a cycloalkylene group having 5 to 12 carbon atoms, an arylene group having 6 to 20 carbon atoms, or a heteroarylene group having 6 to 20 carbon atoms;

m21 and m22 each independently represent an integer of 0 to 10; in a case where m21 and m22 each are an integer of 2 to 10, a plurality of -[$L^{21}$-$X^{21}$]—'s and a plurality of —[$X^{22}$-$L^{22}$]—'s may be identical to or different from each other;

in a case where $Ar^{21}$ and $Ar^{22}$ are each independently an aromatic fused ring group including a benzene ring surrounded by a broken line, $R^{21}$, $R^{22}$, —O-[$L^{21}$-$X^{21}$]$_{m21}$—, and —[$X^{22}$-$L^{22}$]$_{m22}$-O— may be each independently substituted at the benzene ring surrounded by a broken line or may be substituted at a ring included in a fused ring other than the benzene ring surrounded by a broken line; and

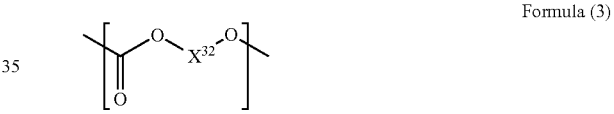

Formula (3)

in Formula (3), $X^{32}$ represents an alkylene group having 2 to 20 carbon atoms, a cycloalkylene group having 4 to 20 carbon atoms, an arylene group having 6 to 20 carbon atoms, or a group obtained by combining these; here, ring-constituting atoms of the cycloalkylene group may be substituted with an oxygen atom, a sulfur atom, or a nitrogen atom.

[2] The phase difference film according to [1], in which the unit represented by Formula (1) is a unit represented by Formula (11);

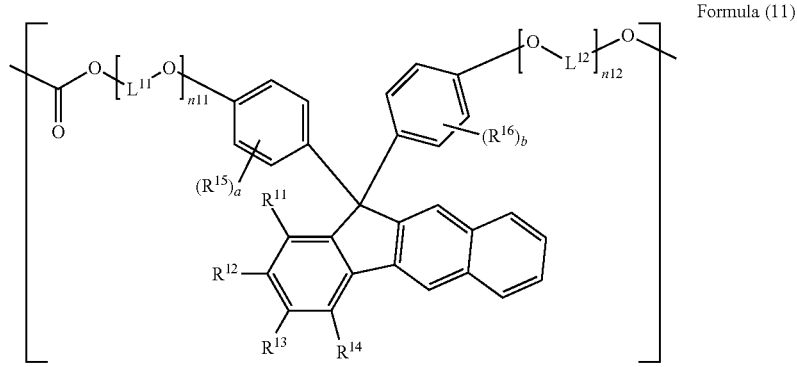

Formula (11)

in Formula (11), $R^{11}$ to $R^{14}$ each independently represent a hydrogen atom or a substituent having a Hammett substituent constant $\sigma_p$ value of less than −0.15, except for an aryl group, a heteroaryl group, and a substituent having a reactive group, and in $R^{11}$ to $R^{14}$, substituents adjacent to each other are not bonded to each other to form a fused ring;

$R^{15}$ and $R^{16}$ each independently represent a methyl group or an ethyl group;

a and b each independently represent an integer of 0 to 2;

$L^{11}$ and $L^{12}$ each independently represent an ethylene group or a propylene group; and n11 and n12 each independently represent an integer of 0 to 3.

[3] The phase difference film according to [1] or [2], in which the unit represented by Formula (2) is a unit represented by Formula (21);

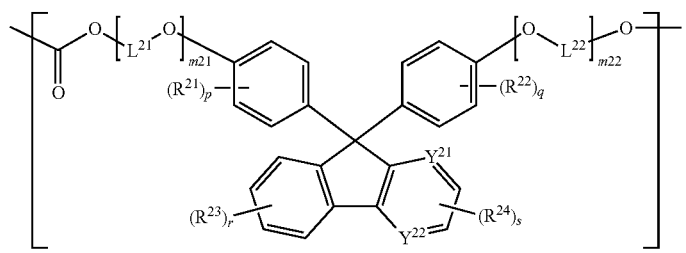

Formula (21)

in Formula (21), $Y^{21}$ and $Y^{22}$ each independently represent a carbon atom or a nitrogen atom, and at least one of $Y^{21}$ and $Y^{22}$ is a nitrogen atom;

$R^{21}$ and $R^{22}$ each independently represent a methyl group or an ethyl group, and $R^{23}$ and $R^{24}$ each independently represent a substituent;

p and q each independently represent an integer of 0 to 3, r represents an integer of 0 to 4, s represents an integer of 0 to 2, and in a case where s is 2, the substituent represented by $R^{24}$ may be bonded to each other to form a fused ring;

$L^{21}$ and $L^{22}$ each independently represent an ethylene group or a propylene group; and m21 and m22 each independently represent an integer of 0 to 3.

[4] The phase difference film according to claim 3, in which in Formula (21), $Y^{21}$ and $Y^2$ are nitrogen atoms.

[5] The phase difference film according to any one of [1] to [4], in which, in Formula (3), $X^{32}$ represents an alkylene group having 5 to 20 carbon atoms having at least one selected from an alicyclic ring, a heterocyclic ring, and an aromatic ring as a substituent, a cycloalkylene group having 4 to 20 carbon atoms, an arylene group having 6 to 20 carbon atoms, or a group obtained by combining these, in which the ring-constituting atom of the cycloalkylene group may be substituted with an oxygen atom, a sulfur atom, or a nitrogen atom.

[6] The phase difference film according to any one of [1] to [5], in which the unit represented by Formula (3) is a unit selected by the following constitutional units;

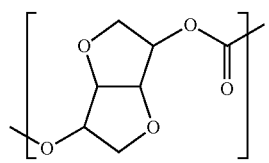

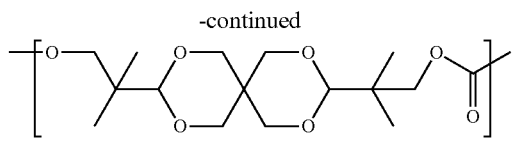

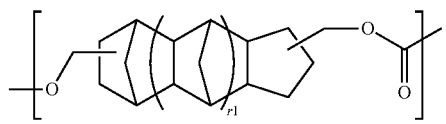

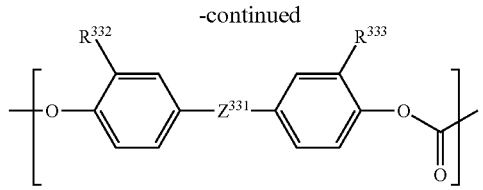

in the constitutional units, $R^{331}$ represents a hydrogen atom or an alkyl group having 1 to 12 carbon atoms; r1 is 0 or 1; $R^{332}$ and $R^{333}$ each independently represent a hydrogen atom or a methyl group, and $Z^{331}$ represents a linking group represented by any of the following structural formulae; and

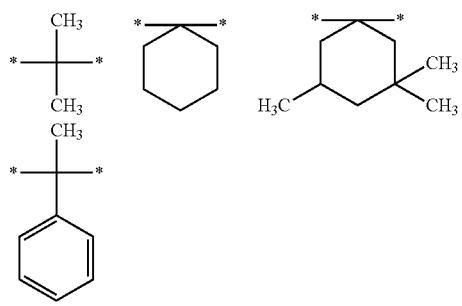

in the above structural formula, * represents a linking position.

[7] The phase difference film according to any one of [1] to [6], a photoelastic coefficient is 0 $cm^2/N$ to $40 \times 10^{-8}$ $cm^2/N$.

According to the present invention, a phase difference film capable of exhibiting sufficient reciprocal wavelength dispersibility can be obtained.

DESCRIPTION OF THE PREFERRED EMBODIMENTS

Hereinafter, the present invention is specifically described. The following description of components may be made based on a representative embodiment or a specific example, but the present invention is not limited to the embodiment. According to the present specification, the numerical range expressed by using "to" means a range including numerical values described before and after "to" as a lower limit value and an upper limit value.

In the present specification, with respect to a group (atomic group), in a case where substitution or unsubstitution is not described, the group includes both of a group having a substituent and a group not having a substituent. For example, an "alkyl group" includes not only an alkyl group not having a substituent (unsubstituted alkyl group) but also an alkyl group having a substituent (substituted alkyl group). In a case where the group (atomic group) in the present specification has a substituent, the number of carbon atoms in each group (atomic group) is a value including the number of carbon atoms of the substituent.

(Unit Represented by Formula (1))

The present invention relates to a phase difference film include the copolymer containing at least one selected from the unit represented by Formula (1) and the unit represented by Formula (2), and the unit represented by Formula (3).

The unit represented by Formula (1) is a constitutional unit provided below. The unit represented by Formula (1) is a unit derived from a negative monomer component.

Formula (1)

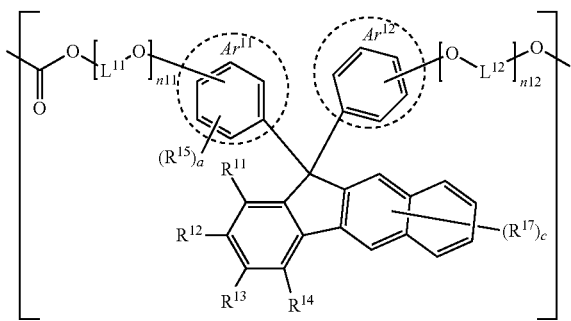

In Formula (1), $R^{11}$ to $R^{14}$ each independently represent a hydrogen atom or a substituent having a Hammett substituent constant $\mu_p$ value of less than −0.15, except for an aryl group, a heteroaryl group, and a substituent having a reactive group, and in $R^{11}$ to $R^{14}$, substituents adjacent to each other are not bonded to each other to form a fused ring.

$R^{15}$ to $R^{17}$ each independently represent a substituent.

a to c each independently represent an integer of 0 or more and represents an integer of the maximum number or less that may be substituted for each ring. In a case where in a to c are integers of 2 or more, the plurality of $R^{15}$, the plurality of $R^{16}$, and the plurality of $R^{17}$ may be identical to or different from each other.

$Ar^{11}$ and $Ar^{12}$ each independently represent an aryl group including a benzene ring surrounded by a broken line or a heteroaryl group including a benzene ring surrounded by a broken line, as one ring included in a fused ring.

$L^{11}$ and $L^{12}$ each independently represent an alkylene group having 2 to 8 carbon atoms, a cycloalkylene group having 5 to 12 carbon atoms, an arylene group having 6 to 20 carbon atoms, or a heteroarylene group having 6 to 20 carbon atoms.

n11 and n12 each independently represent an integer of 0 to 10. In a case where n11 and n12 each are an integer of 2 to 10, a plurality of $L^{11}$ and a plurality of $L^{12}$ may be identical to or different from each other.

In a case where $Ar^{11}$ and $Ar^{12}$ each independently represent an aromatic fused ring group including a benzene ring surrounded by a broken line, $R^{15}$, $R^{16}$, —O-[$L^{11}$—O]$_{n11}$—, and —O-[$L^{12}$]$_{n12}$—O— each independently may be substituted at the benzene ring surrounded by a broken line and may be substituted at a ring included in a fused ring other than the benzene ring surrounded by a broken line.

In Formula (1), $R^{11}$ to $R^{14}$ each independently represent a hydrogen atom or a substituent having a Hammett substituent constant σp value of less than −0.15, except for an aryl group, a heteroaryl group, and a substituent having a reactive group. In $R^{11}$ to $R^{14}$, substituents adjacent to each other are not bonded to each other to form a fused ring. The reactive group is a (meth)acryloyl group.

At least one of $R^{11}$ to $R^{14}$ is a substituent having a Hammett substituent constant σp value of less than −0.15, except for an aryl group, a heteroaryl group, and a substituent having a reactive group. In a case where at least one of $R^{11}$ to $R^{14}$ is an electron donating group having a Hammett's substituent constant σp in the above range, the wavelength dispersion of the unit represented by Formula (1) can be increased, and the reciprocal wavelength dispersibility of the phase difference film can be increased.

The Hammett substituent constant $\sigma_p$ value is more preferably −0.20 or less and even more preferably −0.25 or less. A lower limit value of the Hammett substituent constant σp value is preferably −0.7.

The Hammett substituent constant σp value is disclosed in Correlation Analysis in Chemistry, Ed. By N. B. Chapman, J. Shorter, p. 439 to 540, Plenum Press (1978) and reference documents which are referred thereto. Here, σp is defined as below.

$$\sigma_p = \text{Log}(Ka/Ka^0) = pKa^0 - pKa$$

$pKa^0$ is an acid dissociation constant of benzoic acid at 25° C. in water. pKa is an acid dissociation constant of a benzoic acid substituted at a para position at 25° C. in water. Those not described in the above document may be obtained by the method described in the same documents.

Examples of the substituent having a Hammett substituent constant $\sigma_p$ of less than −0.15 value include a cyclopropyl group (-cycloC$_3$H$_5$, $\sigma_p$ value: −0.21), an amino group (—NH$_2$, $\sigma_p$ value: −0.57), a dimethylamino group (—N(CH$_3$)$_2$, $\sigma_p$ value: −0.63), a benzoylamino group (—NHCOC$_6$H$_5$, $\sigma_p$ value: −0.19), a hydroxyl group (—OH, $\sigma_p$ value: −0.38), a methoxy group (—OCH$_3$, $\alpha_p$ value: −0.28), an ethoxy group (—OC$_2$H$_5$, $\sigma_p$ value: −0.21), and a propoxy group (—OC$_3$H$_7$, $\sigma_p$ value: −0.25). In a case where a plurality of substituents in $R^{11}$ to $R^{14}$ are substituents having a Hammett substituent constant $\sigma_p$ value of less than −0.15, these substituents may be identical to or different from each other.

In Formula (1), it is preferable that at least one of $R^{12}$ and $R^{13}$ is a substituent having a Hammett substituent constant $\sigma_p$ value of less than −0.15, except for an aryl group, a heteroaryl group, and a substituent having a reactive group, and it is preferable that $R^{12}$ and $R^{13}$ are substituents having a Hammett substituent constant $\sigma_p$ value of less than −0.15, except for an aryl group, a heteroaryl group, and a substituent having a reactive group. By reducing the Hammett's substituent constant $\sigma_p$ value of the substituent located at a specific position as described above to be less than −0.15, the wavelength dispersion of the unit represented by Formula (1) can be increased, and the reciprocal wavelength dispersibility of the phase difference film can be increased.

The substituent having a Hammett substituent constant $\sigma_p$ value of less than −0.15 is preferably an alkyl group, an alkoxy group, or a dialkylamino group and more preferably an alkoxy group. The alkoxy group is preferably a methoxy group, an ethoxy group, or a propoxy group and more preferably a methoxy group.

In a case where at least one of $R^{11}$ to $R^{14}$ is caused to be an alkoxy group as above, the structure of the unit represented by Formula (1) becomes compact, and also the wavelength dispersion of the unit represented by Formula (1) can be increased. The reciprocal wavelength dispersibility of a phase difference film can be increased.

According to the present invention, it is preferable that at least one of $R^2$ and $R^{13}$ is an alkoxy group, and it is more preferable that $R^{12}$ and $R^{11}$ are alkoxy groups. $R^{12}$ and $R^{13}$ are preferably a methoxy group, an ethoxy group, or a propoxy group and more preferably a methoxy group.

In Formula (1), $R^{15}$ to $R^{17}$ each independently represent a substituent. The substituent represented by $R^{11}$ to $R^{17}$ is not particularly limited, but examples thereof include a halogen atom, a halogenated alkyl group, an alkyl group, an alkenyl group, an acyl group, a hydroxyl group, a hydroxyalkyl group, an alkoxy group, an aryl group, a heteroaryl group, and an alicyclic group. The substituent represented by $R^{15}$ to $R^{17}$ is preferably an alkyl group, an alkoxy group, or an aryl group, more preferably an alkyl group having 1 to 5 carbon atoms, an alkoxy group having 1 to 5 carbon atoms, or a phenyl group, and particularly preferably a methyl group, a methoxy group, or a phenyl group.

In Formula (1), $Ar^{11}$ and $Ar^{12}$ each independently represent an aryl group including a benzene ring surrounded by a broken line or a heteroaryl group including a benzene ring surrounded by a broken line as one ring included in a fused ring. Among these, $Ar^{11}$ and $Ar^{12}$ each independently and preferably represent an aryl group including a benzene ring surrounded by a broken line. In a case of an aryl group including a benzene ring surrounded by a broken line represented by $Ar^{11}$ and $Ar^{12}$, the aryl group is preferably an aryl group having 6 to 18 carbon atoms, more preferably an aryl group having 6 to 14 carbon atoms, and particularly preferably an aryl group having 6 to 10 carbon atoms. In a case of a heteroaryl group including a benzene ring surrounded by a broken line as one ring included in a fused ring represented by $Ar^{11}$ and $Ar^{12}$, the heteroaryl group is preferably a heteroaryl group having 9 to 14 ring members and more preferably a heteroaryl group having 9 to 10 ring members. Examples of the heteroatom forming the heteroaryl group that may have a substituent represented by $Ar^{11}$ and $Ar^{12}$ include a nitrogen atom, an oxygen atom, and a sulfur atom.

$Ar^{11}$ and $Ar^{12}$ may each independently represent an aryl group formed only from a benzene ring surrounded by a broken line and may be an aromatic fused ring group including a benzene ring surrounded by a broken line as one ring included in a fused ring. According to the present specification, the fused ring of the aromatic fused ring group has aromaticity in the entire fused ring.

In Formula (1), $L^{11}$ and $L^{12}$ each independently represent an alkylene group having 2 to 8 carbon atoms, a cycloalkylene group having 5 to 12 carbon atoms, an arylene group having 6 to 20 carbon atoms, or a heteroarylene group having 6 to 20 carbon atoms. $L^{11}$ and $L^{12}$ each independently and preferably represent an alkylene group having 2 to 8 carbon atoms, more preferably an alkylene group having 2 to 4 carbon atoms, and even more preferably an ethylene group.

In Formula (1), a to c each independently represent an integer of 0 or more, and each represent an integer of the maximum number or less that may be substituted for each ring. a to c each independently and preferably represent an integer of 0 to 4, more preferably an integer of 0 to 3, even more preferably an integer of 0 to 2, still even more preferably 0 or 1, and particularly preferably 0.

In a case where a is an integer of 2 or more, a plurality of $R^{15}$'s may be identical to or different from each other. The plurality of $R^{15}$ may be bonded to each other to form a ring, but it is preferable that the plurality of $R^{15}$'s are not bonded to each other to form a ring.

In a case where b is an integer of 2 or more, a plurality of $R^{16}$'s may be identical to or different from each other. The plurality of $R^{16}$ may be bonded to each other to form a ring, but it is preferable that the plurality of $R^{16}$'s are not bonded to each other to form a ring. In a case where c is an integer of 2 or more, a plurality of $R^{17}$'s may be identical to or different from each other. The plurality of $R^{17}$ may be bonded to each other to form a ring, but it is preferable that the plurality of $R^{17}$'s are not bonded to each other to form a ring.

In Formula (1), n11 and n12 may each independently represent an integer of 0 to 10, is preferably an integer of 0 to 4, more preferably an integer of 0 to 2, and even more preferably 0 or 1. In a case where n11 is an integer of 2 to 10, a plurality of $L^{11}$'s may be identical to or different from each other, and in a case where n12 is an integer of 2 to 10, a plurality of $L^{12}$ may be identical to or different from each other.

The unit represented by Formula (1) is preferably a unit represented by Formula (11).

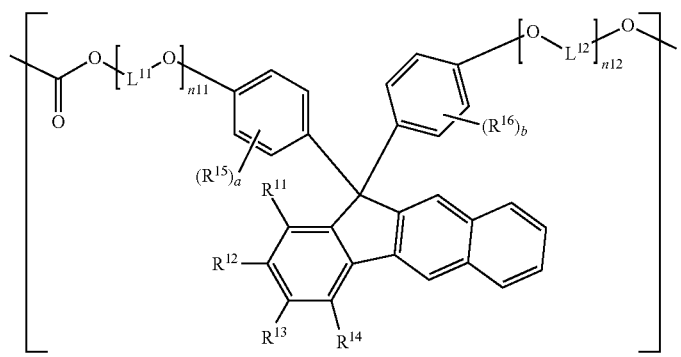

Formula (11)

In Formula (11), $R^{11}$ to $R^{14}$ each independently represent a hydrogen atom or a substituent having a Hammett substituent constant $\sigma_p$ value of less than −0.15, except for an aryl group, a heteroaryl group, and a substituent having a reactive group, and in $R^{11}$ to $R^{14}$, substituents adjacent to each other are not bonded to each other to form a fused ring.

$R^{15}$ and $R^{16}$ each independently represent a methyl group or an ethyl group.

a and b each independently represent an integer of 0 to 2.

$L^{11}$ and $L^{12}$ each independently represent an ethylene group or a propylene group.

n11 and n12 each independently represent an integer of 0 to 3.

The preferable ranges of $R^{11}$ to $R^{14}$ in Formula (11) are the same as the preferable ranges of $R^{11}$ to $R^{14}$ in Formula (1).

In Formula (11), it is preferable that $R^{15}$ and $R^{16}$ each independently represent a methyl group.

In Formula (11), it is preferable that $L^{11}$ and $L^{12}$ each independently represent an ethylene group.

In Formula (11), n11 and n12 are preferably each independently an integer of 0 to 2, and preferably 0 or 1.

In Formula (11), a and b are each independently preferably 0 or 1, and more preferably 0.

Hereinafter, specific examples of the unit represented by Formula (1) are listed below, but the present invention is not limited to the following units.

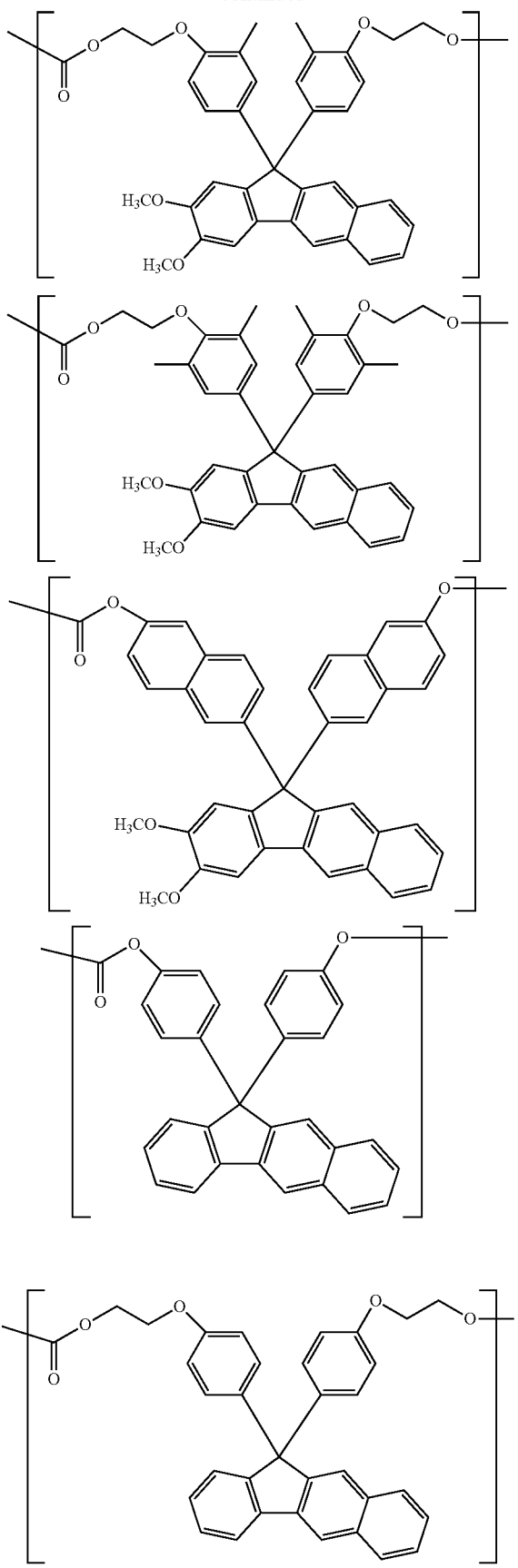

-continued

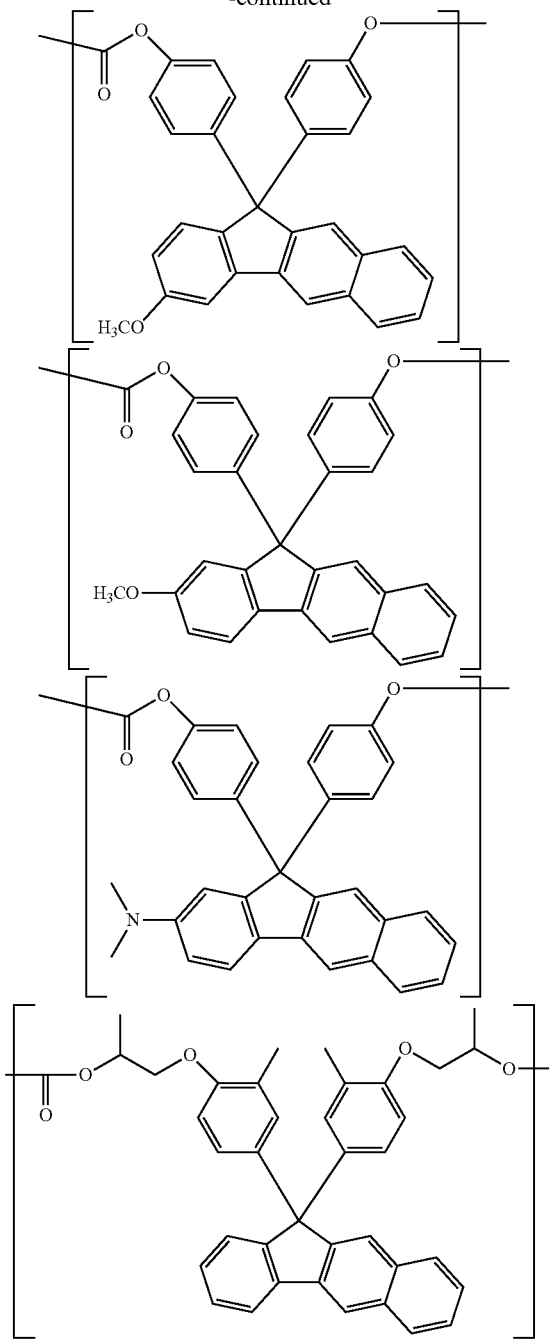

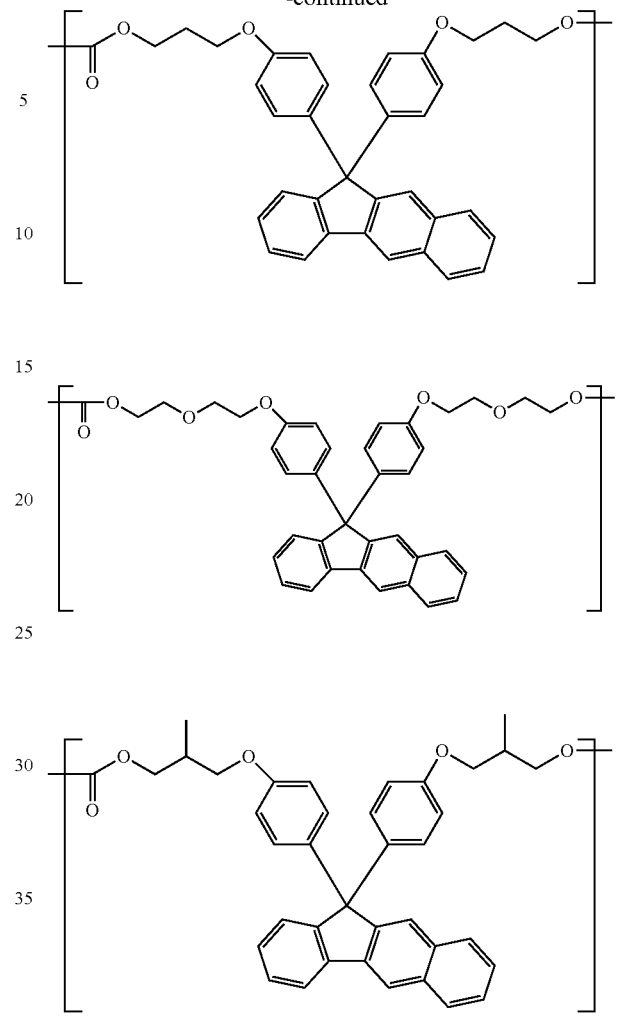

A method of obtaining the unit represented by Formula (1) is not particularly limited, but a compound to be a precursor may be obtained in a commercial way or may be manufactured by synthesis. In a case where the compound to be a precursor is manufactured by synthesis, the compound may be synthesized in a well-known method or a method described in the example.

(Unit Represented by Formula (2))

The unit represented by Formula (2) is a constitutional unit provided below. The unit represented by Formula (2) is a unit derived from a negative monomer component.

Formula (2)

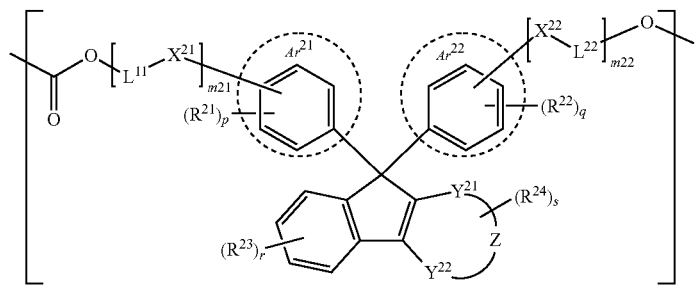

In Formula (2), $Y^{21}$ and $Y^{22}$ each independently represent a carbon atom, an oxygen atom, a sulfur atom, or a nitrogen atom, and at least one $Y^{21}$ or $Y^{22}$ is an oxygen atom, a sulfur atom, or a nitrogen atom;

Z is an atomic group forming a 5-membered to 7-membered ring together with $Y^{21}$—C=C—$Y^{22}$, and the atomic group in which the ring-constituting atoms are a carbon atom, an oxygen atom, a sulfur atom, or a nitrogen atom.

$R^{21}$ to $R^{24}$ each independently represent a substituent.

p to s each independently represent an integer of 0 or more and represents an integer of the maximum number or less that may be substituted for each ring. In a case where p to s are integers of 2 or more, the plurality of $R^{21}$, the plurality of $R^{22}$, the plurality of $R^{23}$, and the plurality of $R^{24}$ may be identical to or different from each other.

$Ar^{21}$ and $Ar^{22}$ each independently represent an aryl group including a benzene ring surrounded by a broken line or a heteroaryl group including a benzene ring surrounded by a broken line, as one ring included in a fused ring.

$X^{21}$ and $X^{22}$ each independently is a group selected from a single bond, —O—, and —S—.

$L^{21}$ and $L^{22}$ each independently represent an alkylene group having 2 to 8 carbon atoms, a cycloalkylene group having 5 to 12 carbon atoms, an arylene group having 6 to 20 carbon atoms, or a heteroarylene group having 6 to 20 carbon atoms.

m21 and m22 each independently represent an integer of 0 to 10. In a case where m21 and m22 each are an integer of 2 to 10, the plurality of -[$L^{21}$-$X^{21}$]— and the plurality of —[$X^{22}$-$L^{22}$]- may be identical to or different from each other.

In a case where $Ar^{21}$ and $Ar^{22}$ each independently represent an aromatic fused ring group including a benzene ring surrounded by a broken line, $R^{21}$, $R^{22}$, —O-[$L^{21}$-$X^{21}$]$_{m21}$—, and —[$X^{22}$-$L^{22}$]$_{m22}$-O— may be each independently substituted at the benzene ring surrounded by a broken line and substituted with at a ring included in a fused ring other than a benzene ring surrounded by a broken line.

In Formula (2), $Y^{21}$ and $Y^{22}$ each independently represent an oxygen atom, a sulfur atom, a nitrogen atom, or a carbon atom, at least one $Y^{21}$ or $Y^{22}$ is an oxygen atom, a sulfur atom, or a nitrogen atom. It is preferable that $Y^{21}$ and $Y^{22}$ each independently represent a nitrogen atom or a carbon atom, and it is preferable that at least one selected from $Y^{21}$ and $Y^{22}$ is a nitrogen atom. It is preferable that both of $Y^{21}$ and $Y^{22}$ are nitrogen atoms.

In Formula (2), Z is an atomic group forming a 5-membered to 7-membered ring together with $Y^{21}$—C=C—Y, and the atomic group in which the ring-constituting atoms are a carbon atom, an oxygen atom, a sulfur atom, or a nitrogen atom. Z is preferably an atomic group for forming a 5 or 6-membered ring together with $Y^{21}$—C=C—$Y^{22}$ and is more preferably an atomic group for forming a 6-membered ring. Z is more preferably an atomic group in which a ring constituting atom is a carbon atom.

In Formula (2), $R^{21}$ to $R^{24}$ each independently represent a substituent. The substituents represented by $R^{21}$ to $R^{24}$ are not particularly limited, and examples thereof include a halogen atom, a halogenated alkyl group, an alkyl group, an alkenyl group, an acyl group, a hydroxyl group, a hydroxyalkyl group, an alkoxy group, an aryl group, a heteroaryl group, an alicyclic group, a cyano group, and a silyl group.

The substituent represented by $R^{21}$ to $R^{23}$ is preferably each independently an alkyl group, an alkoxy group, or an aryl group, more preferably an alkyl group having 1 to 5 carbon atoms, an alkoxy group having 1 to 5 carbon atoms, or a phenyl group, even more preferably a methyl group, a methoxy group, or a phenyl group, and particularly preferably a methyl group or a methoxy group.

$R^{24}$ is preferably an alkyl group, a silyl group, an alkoxy group, or an aryl group, more preferably an alkyl group having 1 to 5 carbon atoms, a silyl group, an alkoxy group having 1 to 5 carbon atoms, or a phenyl group, and even more preferably a methyl group, a silyl group, or a methoxy group. The plurality of $R^{24}$'s may be a group that forms a fused ring and a substituted ring.

In Formula (2), p to s each independently represent an integer of 0 or more, and each represent an integer of the maximum number or less that may be substituted for each ring. p to r each independently and preferably represent an integer of 0 to 4, more preferably an integer of 0 to 3, even more preferably an integer of 0 to 2, still even more preferably 0 or 1, and particularly preferably 0. s is preferably an integer of 0 to 3 and more preferably an integer of 0 to 2.

In a case where p is an integer of 2 or more, a plurality of $R^{21}$'s may be identical to or different from each other. The plurality of $R^{21}$ may be bonded to each other to form a ring, but it is preferable that the plurality of $R^{21}$'s are not bonded to each other to form a ring.

In a case where q is an integer of 2 or more, a plurality of $R^{22}$'s may be identical to or different from each other. The plurality of $R^{22}$ may be bonded to each other to form a ring, but it is preferable that the plurality of $R^{22}$'s are not bonded to each other to form a ring.

In a case where r is an integer of 2 or more, a plurality of $R^{23}$'s may be identical to or different from each other. The plurality of $R^{23}$ may be bonded to each other to form a ring, but it is preferable that the plurality of $R^{23}$'s are not bonded to each other to form a ring.

In a case where s is an integer of 2 or more, a plurality of $R^{24}$'s may be identical to or different from each other, and a plurality of $R^{24}$'s may be bonded to each other to form a ring. In this case, the plurality of $R^{24}$'s are preferably a group that forms a fused ring with a substituted ring. The fused ring may further have a substituent, and in this case, examples of the substituent include substituents exemplified as $R^{24}$ as preferable substituents.

In a case where the plurality of $R^{24}$'s are bonded to each other and are groups for forming a fused ring together with a substituted ring, the number of rings for forming a fused ring is preferably 4 or less, more preferably 3 or less, and even more preferably 2. In a case where the number of rings for forming a fused ring is in the above range, the coloration of the copolymer including the constitutional unit is easily suppressed.

In Formula (2), $Ar^{21}$ and $Ar^{22}$ each independently represent an aryl group including a benzene ring surrounded by a broken line or a heteroaryl group including a benzene ring surrounded by a broken line as one ring included in a fused In Formula (2), m21 and m22 may each independently represent an integer of 0 to 10, is preferably an integer of 0 to 4, more preferably an integer of 0 to 2, and even more preferably 0 or 1. In a case where m21 is an integer of 2 to 10, a plurality of $-[L^{21}-X^{21}]-$'s may be identical to or different from each other, and in a case where m22 is an integer of 2 to 10, a plurality of $-[X^{22}-L^{22}]-$ may be identical to or different from each other.

The unit represented by Formula (2) is preferably a unit represented by Formula (21).

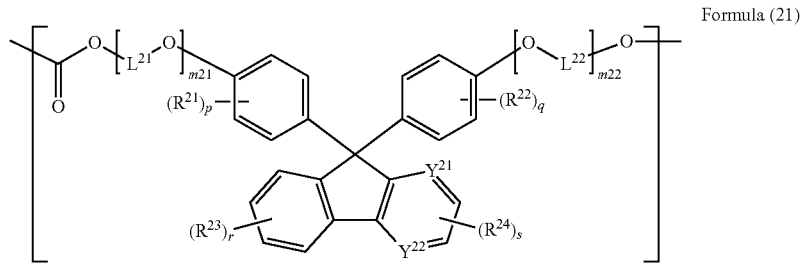

Formula (21)

ring. Among these, $Ar^{21}$ and $Ar^{22}$ are each independently and preferably an aryl group including a benzene ring surrounded by a broken line. In a case of an aryl group including a benzene ring surrounded by a broken line represented by $Ar^{21}$ and $Ar^{22}$, the aryl group is preferably an aryl group having 6 to 18 carbon atoms, more preferably an aryl group having 6 to 14 carbon atoms, and particularly preferably an aryl group having 6 to 10 carbon atoms. In a case of a heteroaryl group including a benzene ring surrounded by a broken line as one ring included in a fused ring represented by $Ar^{21}$ and $Ar^{22}$, the heteroaryl group is preferably a heteroaryl group having 9 to 14 ring members and more preferably a heteroaryl group having 9 to 10 ring members. Examples of the heteroatom forming the heteroaryl group that may have a substituent represented by $Ar^{21}$ and $Ar^{22}$ include a nitrogen atom, an oxygen atom, and a sulfur atom.

$Ar^{21}$ and $Ar^{22}$ may be each independently an aryl group formed only from a benzene ring surrounded by a broken line and may be an aromatic fused ring group including a benzene ring surrounded by a broken line as one ring included in a fused ring. According to the present specification, the fused ring of the aromatic fused ring group has aromaticity in the entire fused ring.

In Formula (2), $L^{21}$ and $L^{22}$ are each independently an alkylene group having 2 to 8 carbon atoms, a cycloalkylene group having 5 to 12 carbon atoms, an arylene group having 6 to 20 carbon atoms, or a heteroarylene group having 6 to 20 carbon atoms. $L^{21}$ and $L^{22}$ each independently and preferably represent an alkylene group having 2 to 8 carbon atoms, more preferably an alkylene group having 2 to 4 carbon atoms, and even more preferably an ethylene group.

In Formula (2), $X^{21}$ and $X^{22}$ each independently represent a group selected from a single bond, —O—, and —S—. Among these, $X^{21}$ and $X^{22}$ each are preferably a single bond or —O—.

In Formula (21), $Y^{21}$ and $Y^{22}$ each independently represent a carbon atom or a nitrogen atom, and at least one of $Y^{21}$ and $Y^{22}$ is a nitrogen atom.

$R^{21}$ and $R^{22}$ each independently represent a methyl group or an ethyl group, and $R^{23}$ and $R^{24}$ each independently represent a substituent.

p and q each independently represent an integer of 0 to 3, r represents an integer of 0 to 4, s represents an integer of 0 to 2, and in a case where s is 2, the substituent represented by $R^{24}$ may be bonded to each other to form a fused ring.

$L^{21}$ and $L^{22}$ each independently represent an ethylene group or a propylene group.

m21 and m22 each independently represent an integer of 0 to 3.

The preferable ranges of $Y^{21}$ and $Y^{22}$ in Formula (21) are the same as the preferable ranges of $Y^{21}$ and $Y^{22}$ in Formula (2). In Formula (21), $Y^{21}$ and $Y^{22}$ are preferably nitrogen atoms.

The preferable range of $R^{23}$ and $R^{24}$ in Formula (21) is the same as the preferable range of $R^{23}$ and $R^{24}$ in Formula (2).

$L^{21}$ and $L^{22}$ in Formula (21) each independently represent an ethylene group or a propylene group, and preferably an ethylene group.

In Formula (21), m21 and m22 each independently represents an integer of 0 to 3, preferably an integer of 0 to 2, and more preferably 0 or 1.

p and q each independently represents an integer of 0 to 3, more preferably an integer of 0 to 2, more preferably 0 or 1, and particularly preferably 0. r represents an integer of 0 to 4, more preferably an integer of 0 to 3, even more preferably an integer of 0 to 2, still even more preferably 0 or 1, and particularly preferably 0. s represents an integer of 0 to 2. In a case where s is 2, two substituents represented by $R^{24}$ may be bonded to each other to form a fused ring.

Hereinafter, specific examples of the unit represented by Formula (2) are listed below, but the present invention is not limited to the following constitutional units.

19
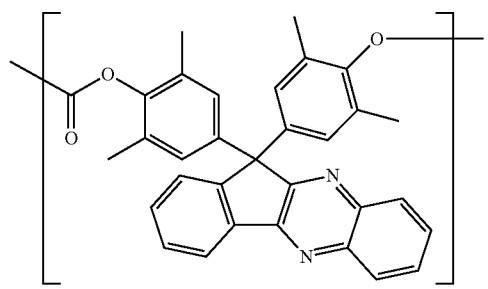
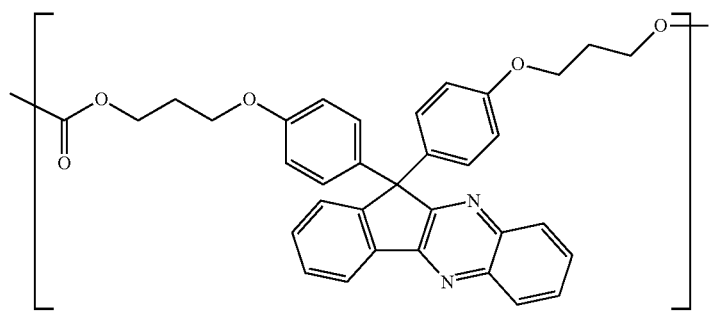
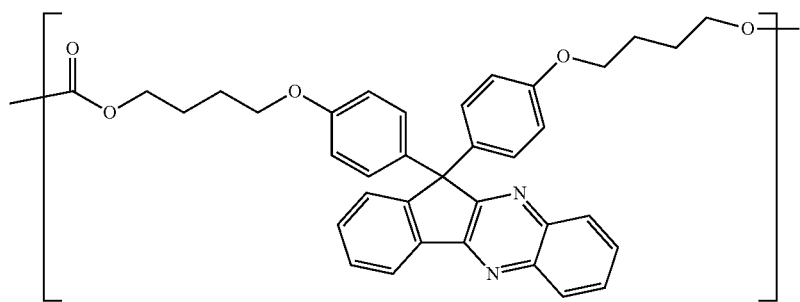
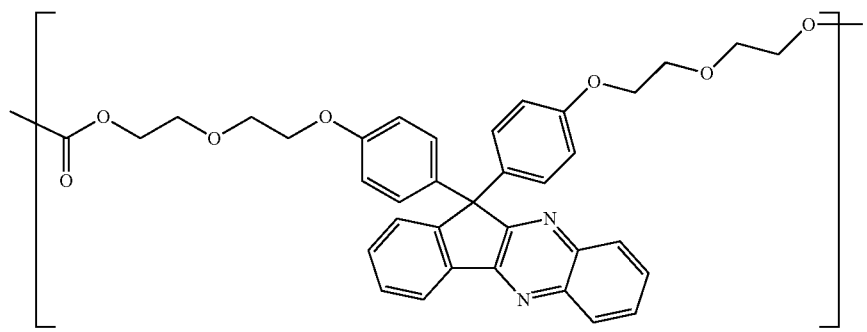
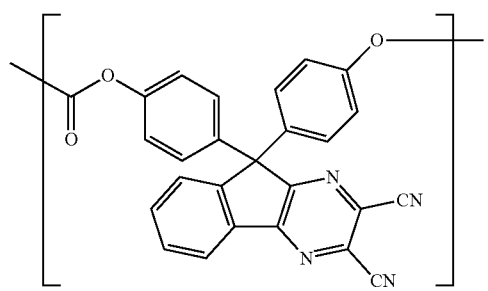
20
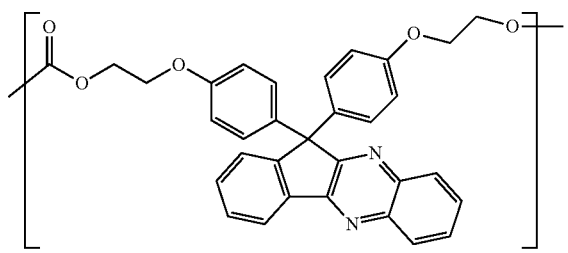
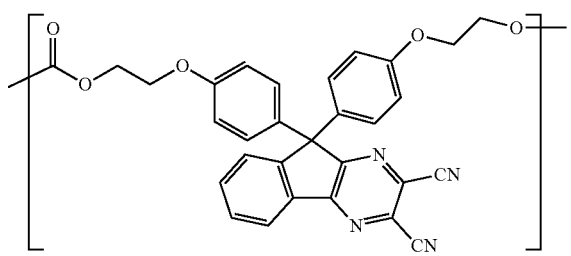

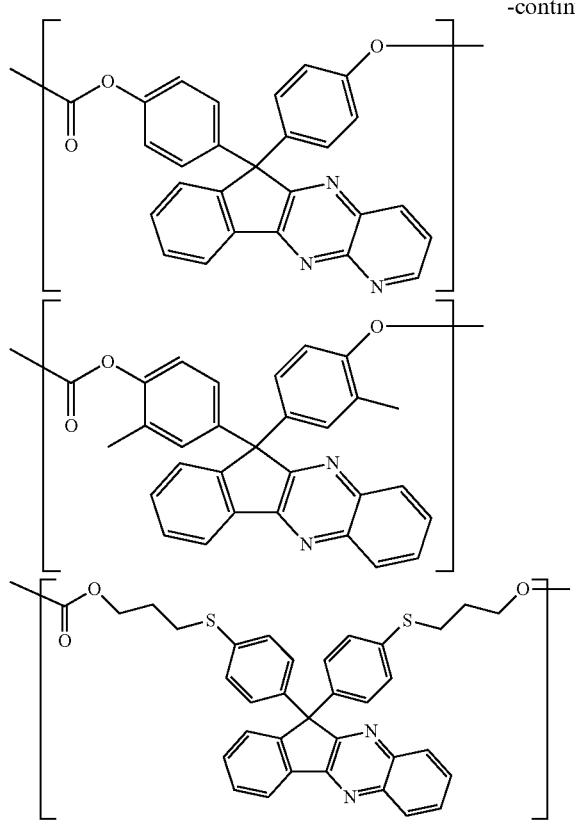
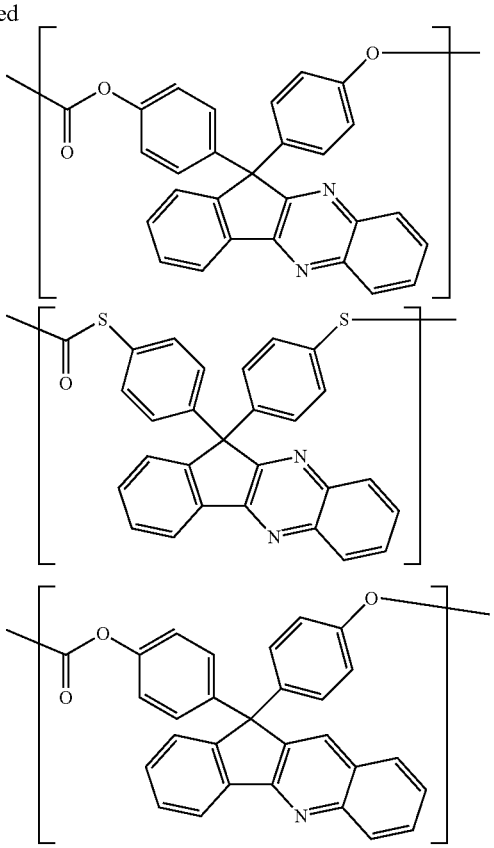

A method of obtaining the unit represented by Formula (2) is not particularly limited, but a compound to be a precursor may be obtained in a commercial way or may be manufactured by synthesis. In a case where the compound to be a precursor is manufactured by synthesis, the compound may be synthesized in a well-known method or a method described in the example.

(Unit Represented by Formula (3))

The unit represented by Formula (3) is a constitutional unit provided below. The unit represented by Formula (3) is a unit derived from a positive monomer component.

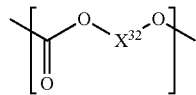

Formula (3)

In Formula (3), $X^{32}$ represents an alkylene group having 2 to 20 carbon atoms, a cycloalkylene group having 4 to 20 carbon atoms, an arylene group having 6 to 20 carbon atoms, or a combination thereof. However, the ring constituting atom of the cycloalkylene group may be substituted with an oxygen atom, a sulfur atom, or a nitrogen atom.

The alkylene group, the cycloalkylene group, and the arylene group that can be represented by $X^{32}$ may have a substituent. In this case, the number of carbon atoms of each group is preferably within the above range including the number of carbon atoms of the substituent. The substituent is not particularly limited, but examples thereof include an alkyl group, an alkenyl group, an acyl group, a hydroxyl group, a hydroxyalkyl group, an alkoxy group, an aryl group, a heteroaryl group, and an alicyclic group. The carbon atom constituting the alkylene group may be substituted with an oxygen atom, a sulfur atom or a nitrogen atom, and the ring constituting atom of the cycloalkylene group may be substituted with an oxygen atom, a sulfur atom, or a nitrogen atom.

$X^{32}$ may be a linking group including the above groups, may be a linking group formed from the above groups, or may be a linking group having a structure obtained by combining two or more of the above groups. $X^{32}$ may be a group in which cycloalkylene groups are linked by a single bond, —O—, —S—, or an alkylene group, arylene groups may be groups linked by a single bond, —O—, —S—, or an alkylene group, or in which a cycloalkylene group and an arylene group are may be groups linked by a single bond, —O—, —S—, or an alkylene group. However, $X^{32}$ is a group not containing —O—C(=O)—O—.

Specific examples of $X^{32}$ of the unit represented by Formula (3) are listed below, but the structure of $X^{32}$ is not limited to the following structure. In the following specific examples, * represents a linking site in a main chain of the unit represented by Formula (3).

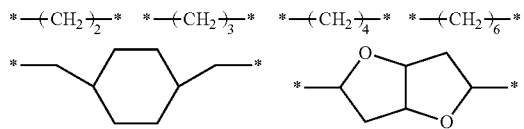

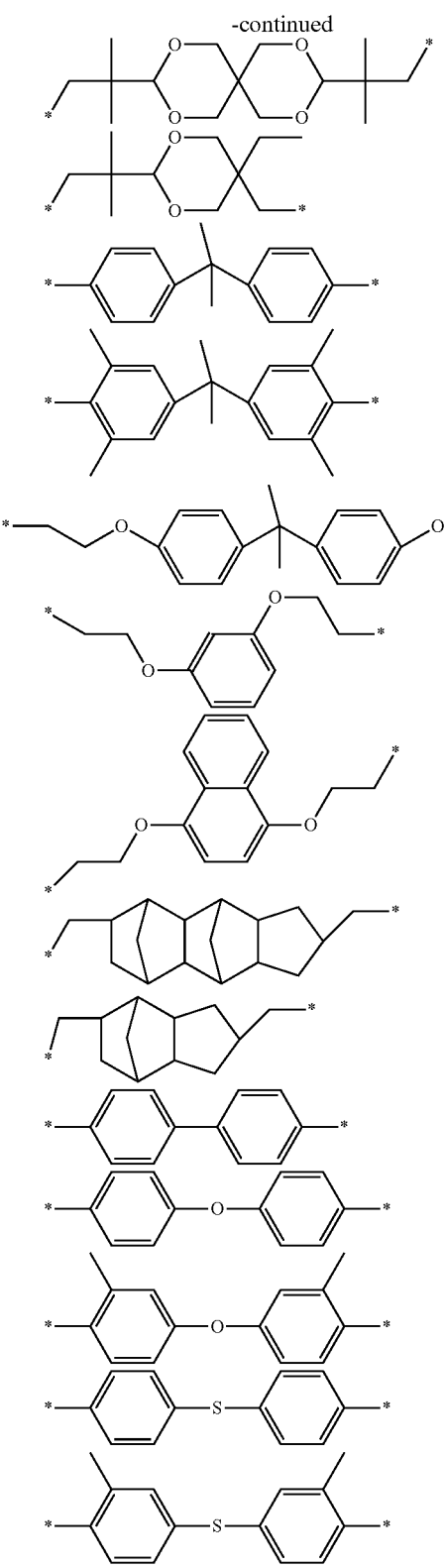

However, the ring constituting atom of the cycloalkylene group may be substituted with an oxygen atom, a sulfur atom, or a nitrogen atom. In addition, in a case where each group has a substituent, the number of the carbon atoms is the number of the carbon atoms also including the number of the carbon atoms of the substituent.

In a case where $X^{32}$ is an alkylene group having at least one selected from an alicyclic ring, a heterocyclic ring, and an aromatic ring as a substituent, the alicyclic ring, the heterocyclic ring, and the aromatic ring are preferably a 5-membered ring or a 6-membered ring. In a case where $X^{32}$ is a cycloalkylene group, the cycloalkylene group is preferably a 5-membered ring or a 6-membered ring. When $X^{32}$ is an arylene group, the number of carbon atoms in the arylene group is preferably 6 to 12.

The unit represented by Formula (3) is preferably a unit selected from the following constitutional units.

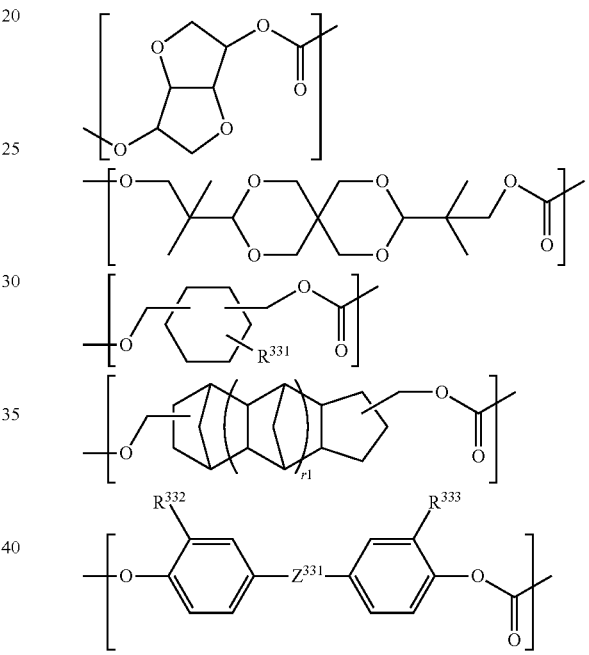

In the above constitutional units, $R^{331}$ represents a hydrogen atom or an alkyl group having 1 to 12 carbon atoms. r1 represents 0 or 1. $R^{332}$ and $R^{333}$ each independently represent a hydrogen atom or a methyl group, and $Z^{331}$ is a linking group represented by any of the following structural formulae. * in the following structural formula represents a linking position.

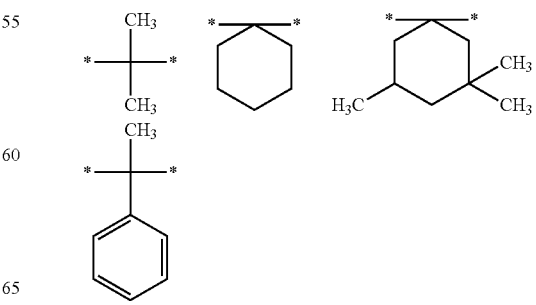

Among these, in Formula (3), $X^{32}$ preferably represents an alkylene group having 5 to 20 carbon atoms having at least one selected from an alicyclic ring, a heterocyclic ring, and an aromatic ring as a substituent, a cycloalkylene group having 4 to 20 carbon atoms, a group, an arylene group having 6 to 20 carbon atoms, or a combination thereof.

In the constitutional units, $R^{331}$ is preferably a hydrogen atom, and $R^{332}$ and $R^{333}$ are preferably hydrogen atoms. $Z^{331}$ is preferably a linking group represented by the following structural formula.

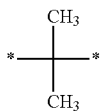

That is, the unit represented by Formula (3) is particularly preferably a unit selected from the following constitutional units.

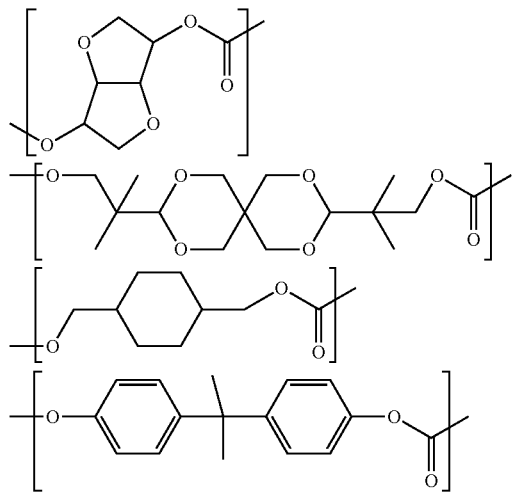

A method of obtaining the unit represented by Formula (3) is not particularly limited, but a compound to be a precursor may be obtained in a commercial way or may be manufactured by synthesis. In a case where the compound to be a precursor is manufactured by synthesis, the compound may be synthesized in a well-known method or a method described in the example.

(Copolymer)

The phase difference film of the present invention includes a copolymer containing at least one selected from the unit represented by Formula (1) and the unit represented by Formula (2), and the unit represented by Formula (3). The phase difference film of the present invention may further contain another constitutional unit as long as the effects of the present invention are exhibited. For example, the copolymer may further include a polyester oligomer.

The unit represented by Formula (1) and the unit represented by Formula (2) are preferably included in an amount of 10 mol % or more and more preferably included in an amount of 20 mol % or more with respect to the total constitutional units of the copolymer. The unit represented by Formula (1) and the unit represented by Formula (2) are preferably included in an amount of 80 mol % or less and more preferably included in an amount of 70 mol % or less with respect to all the constitutional units of the copolymer. The unit represented by Formula (1) and the unit represented by Formula (2) may be 60 mol % or less and may be 50 mol % with respect to all the constitutional units of the copolymer. In the unit represented by Formula (1) and the unit represented by Formula (2), the wavelength dispersion is sufficiently large, and a negative birefringence is large. Therefore, the addition amount of the negative monomer component necessary for expressing the desired phase difference Re (548) can be suppressed, and the choice of units represented by Formula (3), which is more generally used can be increased. This also makes it possible to suppress the manufacturing cost of the phase difference film.

The unit represented by Formula (3) is preferably included in an amount of 20 mol % or more and more preferably 30 mol % or more, with respect to all the constitutional units of the copolymer. The unit represented by Formula (3) is preferably included in an amount of 90 mol % or less and more preferably 80 mol % or less with respect to all the constitutional units of the copolymer.

The weight average molecular weight of the copolymer is preferably 10,000 or more, more preferably 20,000 or more, and even more preferably 50,000 or more. The weight average molecular weight of the copolymer is preferably 200,000 or less and more preferably 100,000 or less.

The molecular weight (mass average molecular weight) of the copolymer in the present invention can be measured using gel permeation chromatography (GPC). Specifically, the molecular weight can be obtained by using tetrahydrofuran as a solvent, using polystyrene gel, and using a conversion molecular weight calibration curve obtained in advance from a constituent curve of standard monodisperse polystyrene.

The measurement conditions of gel permeation chromatography (GPC) are as follows.

Column: Shodex KF801, KF803L, KF800L, and KF800D (four columns manufactured by Showa Denko K. K. are connected to be used)

Column temperature: 40° C.

Sample concentration: 0.5 mass %

Detector: RI-2031plus (manufactured by JASCO Corporation)

Pump: RI-2080plus (manufactured by JASCO Corporation)

Flow rate (flow rate): 0.8 ml/min

Injection volume: 10 μl

Calibration curve: Shodex standard polystyrene (manufactured by Showa Denko K.K.) Mw=1320 to 2,500,000 calibration curves with 10 samples are used.

(Method of Polymerizing Copolymer)

The copolymer may be polymerized by using well-known reaction means. Examples thereof include (a) a fusing method performed by reacting phosgene or a phosgene precursor with at least one selected from dihydric phenol and and a derivative of dihydric phenol or (b) a method of performing transesterification on at least one selected from dihydric phenol and a derivative of dihydric phenol by using a carbonate precursor material such as carbonic acid diester. The phosgene precursor means triphosgene or diphosgene, and hereinafter, at least one selected from phosgene and a phosgene precursor may be simply referred to as phosgene. The at least one selected from dihydric phenol and a derivative of dihydric phenol is simply referred to as dihydric phenol.

As the dihydric phenol, it is preferable to use the compound that can be the unit represented by Formula (1) or (2). As the derivative of dihydric phenol, a chlorocarbonic acid compound or the like that may become the unit represented by Formula (1) or (2) is preferably used. It is preferable to use the compound which can become the unit represented by Formula (3), and the chlorocarbonic acid compound which can become a unit represented by Formula (3) as a dihydric phenol or a dihydric phenol derivative.

In a case where the copolymer is polymerized, a catalyst, a end terminator, an antioxidant of a dihydric phenol, a heat stabilizer, or the like may be used, if necessary.

The reaction by using (a) the fusing method for reacting phosgene is the reaction between dihydric phenol and phosgene and is performed in the presence of an acid binder and an organic solvent. As the acid binder, for example, alkali metal hydroxide such as sodium hydroxide or potassium hydroxide or an amine compound such as pyridine is used. As the organic solvent, for example, halogenated hydrocarbon such as methylene chloride and chlorobenzene is used. In order to promote the reaction, for example, a catalyst such as tertiary amine such as triethylamine, tetra-n-butylammonium bromide, or tetra-n-butylphosphonium bromide, a quaternary ammonium compound, and a quaternary phosphonium compound may be used. In this case, it is preferable that the reaction temperature is usually maintained at 0° C. to 40° C., the reaction time is about 10 minutes to 5 hours, and the pH during the reaction is maintained to 9 or more.

The reaction using (b) the transesterification method is performed by transesterification reaction between dihydric phenol and carbonate ester, and mixing dihydric phenol and carbonate ester while heating in the presence of an inert gas, and distilling off generated alcohol or phenol. The reaction temperature varies depending on the boiling point of the generated alcohol or phenol but is usually in the range of 120° C. to 350° C. During the latter stage of the reaction, the system is depressurized to about $1.3 \times 10^1$ to $1.3 \times 10^3$ Pa such that the distillation of the generated alcohol or phenol is easily performed. The reaction time is generally about 1 to 4 hours.

Examples of the carbonate ester include ester such as an aryl group having 6 to 10 carbon atoms which may have a substituent, an aralkyl group, or an alkyl group having 1 to 4 carbon atoms. Specific examples thereof include diphenyl carbonate, ditolyl carbonate, bis (chlorophenyl) carbonate, m-carbonate, dinaphthyl carbonate, bis (diphenyl) carbonate, dimethyl carbonate, diethyl carbonate, and dibutyl carbonate, and among these, diphenyl carbonate is preferably used.

In the reaction using the method of transesterifying (b), a polymerization catalyst can be used to increase the polymerization rate. Examples of the polymerization catalyst include an alkali earth metal compound such as sodium hydroxide, potassium hydroxide, sodium salt of dihydric phenol, and potassium salt, an alkali earth metal compound such as calcium hydroxide, barium hydroxide, and magnesium hydroxide, a nitrogen-containing basic compound such as tetramethylammonium hydroxide, tetraethylammonium hydroxide, trimethylamine, and triethylamine, and a catalyst used for general esterification reaction or transesterification reaction such as alkoxides of alkali metal and alkali earth metal, organic acid salts of alkali metal and alkali earth metal, zinc compounds, boron compounds, aluminum compounds, silicon compounds, germanium compounds, organotin compounds, lead compounds, osmium compounds, antimony compounds, manganese compounds, titanium compounds, and zirconium compounds may be used. The catalysts may be used singly or two or more kinds thereof may be used in combination. The usage amount of the polymerization catalyst is preferably $1 \times 10^{-8}$ to $1 \times 10^{-3}$ equivalent with respect to 1 mol of dihydric phenol of a raw material.

In the polymerization reaction, as the copolymer, monofunctional phenols that are generally used as an end terminator may be used. For example, in the case of the reaction using phosgene, since monofunctional phenols are used as an end terminator in order to adjust the molecular weight, and the obtained copolymer is sealed by a group of which the terminal is based on monofunctional phenols, heat stability becomes excellent.

(Phase Difference Film)

The present invention relates to a phase difference film include the copolymer containing at least one selected from the unit represented by Formula (1) and the unit represented by Formula (2), and the unit represented by Formula (3). In the present specification, the phase difference film means a film that has birefringence on the entire surface or a part thereof. The phase difference film of the present invention may be a single layer film or a multilayer film including a plurality of layers, but is preferably a single layer film.

Here, the in-plane retardation at each wavelength of the phase difference film satisfies the following conditions.

$$20 \text{ nm} \leq \text{Re } (548) \leq 300 \text{ nm}$$

$$0.5 < \text{Re } (446)/\text{Re } (548) < 1.0$$

$$1.0 < \text{Re } (629)/\text{Re } (548) < 2.0$$

Here, Re (446), Re (548), and Re (629) represent in-plane retardations at wavelengths of 446 nm, 548 nm, and 629 nm, respectively.

The fact that in-plane retardation at each wavelength of the phase difference film satisfying the above conditions means that the phase difference film of the present invention exhibits reciprocal wavelength dispersibility. That is, the phase difference film of the present invention is a phase difference film having reciprocal wavelength dispersibility.

The in-plane retardation at each wavelength can be measured with an ellipsometer (manufactured by JASCO Corporation, M150).

The in-plane retardation at each wavelength of the phase difference film preferably satisfies the following conditions.

$$50 \text{ nm} \leq \text{Re } (548) \leq 200 \text{ nm}$$

$$0.6 < \text{Re } (446)/\text{Re } (548) < 0.9$$

$$1.0 < \text{Re } (629)/\text{Re } (548) < 1.5$$

Since the phase difference film of the present invention has the unit represented by Formula (1) and/or the unit represented by Formula (2), and the unit represented by Formula (3), sufficient reciprocal wavelength dispersibility can be exhibited. This is because the unit represented by Formula (1) and the unit represented by Formula (2) have a large negative birefringence and sufficiently large wavelength dispersion.

Since the phase difference film of the present invention can exhibit sufficient reciprocal wavelength dispersibility, it can be said that it is easy to adjust the phase difference as desired. For example, since the unit represented by Formula (1) and the unit represented by Formula (2) have a large negative birefringence and sufficiently large wavelength dispersion, it is also possible to increase the choice of units represented by Formula (3) in order to adjust the phase difference Re (548) as desired. The monomer component amount of the unit represented by Formula (3) which is more generally used than the unit represented by Formula (1) and the unit represented by Formula (2) can be increased. This also makes it possible to suppress the manufacturing cost of the phase difference film. As the phase difference film, the phase difference is preferably adjusted to values close to, for example, Re (548)=137.5 nm, Re (446/548)=0.818, and Re (629/548)=1.182.

The present invention is also characterized in that a phase difference film having a smaller photoelastic coefficient can be obtained. Specifically, in a case where the same positive monomer component represented by Formula (3) is used, it is possible to obtain a phase difference film having a smaller photoelastic coefficient than a case where other negative monomer components are used by using the negative monomer component represented by Formula (1) or (2).

In the present invention, the photoelastic coefficient of the phase difference film is preferably from 0 cm$^2$/N to 40×10$^{-8}$ cm$^2$/N and more preferably 0 cm$^2$/N to 30×10$^8$ cm$^2$/N.

The thickness of the phase difference film of the present invention is preferably 10 μm or more, and more preferably 20 μm or more. The thickness of the phase difference film is preferably 500 μm or less and more preferably 300 μm or less.

(Method of Manufacturing Phase Difference Film)

The phase difference film of this invention can be manufactured by a well-known method by using the composition including the copolymer mentioned above. Specific examples thereof include a casting method in which the copolymer of the present invention is dissolved in a solvent and casted, and then the solvent is removed, and a method of melt-casting the copolymer without using a solvent, but the present invention is not limited thereto. For example, in the casting method, a dope solution in which the copolymer is dissolved in an ether-based solvent such as tetrahydrofuran, an aromatic solvent such as toluene, or a halogen-based solvent such as methylene chloride can be used. A method for manufacturing a phase difference film includes a step of applying a composition including a copolymer to a substrate. In a case where the composition including a copolymer is applied to the substrate, examples thereof include spin coating, an air knife coating method, a curtain coating method, a roller coating method, a wire bar coating method, a gravure coating method, and a die coating method, and a wire bar coating method is preferably used.

It is preferable to have a step of drying the composition applied in the application step after the step of applying the composition including a copolymer to the substrate. The drying step can be performed by a method of heating the substrate having a coating film (applied composition) with a heated hot plate or the like. The drying step can also be performed by applying wind at a predetermined temperature to the coating film.

It is preferable to provide an stretching step after the drying step. In the stretching step, the film obtained through the drying step is cut into a predetermined size, and fixed end uniaxial stretching is performed to manufacture a stretched film (phase difference film). The phase difference of the phase difference film can be measured by using a phase difference measuring device (KOBRA-WPR manufactured by Oji Scientific Instruments Co., Ltd.). In a case where a positive phase difference develops with respect to the stretching direction, the copolymer exhibits a positive refractive index anisotropy, and in a case where a negative phase difference develops, the copolymer exhibits a negative refractive index anisotropy.

The phase difference film of the present invention can be obtained by stretching a film, and conditions such as a stretching method, a stretching temperature, a stretching ratio, a stretching speed, and thermal aging after stretching, and the like can be appropriately changed according to the purpose.

Examples of the stretching method include a free end stretching method, a fixed end stretching method, a free end contraction method, and a fixed end contraction method, and the methods may be used singly or may be used simultaneously or sequentially. Examples of the stretching direction include a horizontal direction, a vertical direction, a thickness direction, a diagonal direction, and the stretching direction is not particularly limited.

In general, the stretching temperature is preferably set based on the glass transition temperature (Tg) of the film. Specifically, the stretching temperature is preferably Tg−20° C. or higher, more preferably Tg−10° C. or higher. The stretching temperature is preferably Tg+30° C. or lower and more preferably Tg+20° C. or lower. By selecting such conditions, the phase difference value in the phase difference film easily becomes homogeneous, and the phase difference film hardly becomes cloudy.

The stretching ratio can be appropriately selected in order to impart the intended optical properties at a desired thickness. In a case where the unstretched case is 1 time the case before stretching, the stretching ratio is preferably 1.1 times or more and more preferably 1.5 times or more. In order to suppress breakage during stretching and prevent fluctuations in optical properties due to long term use under high temperature conditions, the stretching ratio is preferably 6 times or less, more preferably 4 times or less, and even more preferably 3 times or less.

In order to increase productivity and suppress an excessive increase in the stretching ratio in order to obtain a desired phase difference, it is preferable to appropriately adjust the stretching speed. The stretching speed is adjusted to cause the strain rate represented by the following formula preferably to be 50% or more, more preferably to be 100% or more, and even more preferably to be 200% or more. In order to suppress breakage in a case of stretching and prevent fluctuations in optical properties under high temperature conditions, the stretching speed is adjusted to cause the strain rate represented by the following formula preferably to be 1,500% or less and more preferably to be 1,000% or less.

Strain rate (%/min)=stretching speed(mm/min)/length of raw film (mm)×100

(Laminate and Liquid Crystal Display Device)

The present invention may relate to a laminate having the phase difference film. For example, the phase difference film is used for viewing angle compensation of various displays (a liquid crystal display device, an organic EL display device, a plasma display device, an FED field emission display device, and an SED surface electric field display device), antireflection of external light, color compensation, or conversion of linearly polarized light into circularly polarized light. Since there is tendency in that phase difference film of the present invention has ideal phase difference characteristics at each wavelength in the visible light region, has a small photoelastic coefficient, excellent heat resistance, excellent moldability, high transparency, and less coloration, it is suitable for a ¼λ plate, a circular polarization plate, an image display device, and the like.

The present invention may also relate to a polarizing plate having the above phase difference film. The method of manufacturing a polarizing plate is not particularly limited, and it can be manufactured in a general method. For example, a polarizing plate is manufactured by laminating a protective film on a polarizer prepared by adsorbing and dying dichroic substances such as iodine and dichroic dyes on various films and crosslinking, stretching, and drying the films by a method known in the related art. Thus, the polarizing plate is composed of a polarizer and two protective films protecting both surfaces thereof, and the phase difference film of the present invention can be used as at least one of the two protective films.

The present invention may also relate to a liquid crystal display device having the phase difference film. The liquid crystal display device has the phase difference film or the polarizing plate of the present invention.

The liquid crystal display device has a configuration of having a liquid crystal cell obtained by supporting a liquid crystal between two electrode substrates, two polarizers disposed on both sides thereof, and at least one phase difference film arranged between the liquid crystal cell and the polarizer. The liquid crystal layer of the liquid crystal cell is usually formed by sealing liquid crystal in a space formed by sandwiching a spacer between two substrates. The transparent electrode layer is formed on the substrate as a transparent film including a conductive substance. The liquid crystal cell may further be provided with a gas barrier layer, a hard coat layer, or an undercoat layer (used for adhesion of the transparent electrode layer). These layers are usually provided on the substrate. The substrate of the liquid crystal cell preferably has a thickness of 50 μm to 2 mm.

As the display mode, for example, various display modes such as Twisted Nematic (TN), In-Plane Switching (IPS), Ferroelectric Liquid Crystal (FLC), Anti-ferroelectric Liquid Crystal (AFLC), Optically Compensatory Bend (OCB), Super Twisted Nematic (STN), Vertically Aligned (VA), Electrically Controlled Birefringence (ECB), and Hybrid Aligned Nematic (HAN) modes are proposed. A display mode in which the above display modes are aligned and divided has been proposed. Among these modes, particularly, the IPS mode liquid crystal display device is preferably used. These liquid crystal display devices may be any of a transmissive type, a reflective type, and a semitransmissive type.

EXAMPLES

Hereinafter, characteristics of the present invention are more specifically described with reference to the examples and comparative examples. A material, an amount used, a treatment detail, a treatment order, and the like provided in the following examples can be suitably changed without departing from the gist of the present invention. Accordingly, the scope of the present invention should not be construed in a limited manner by the following specific examples.

Synthesis Example 1

9.0 g of 2,3-benzofluorenone and 8.6 g of phenoxyethanol were suspended in 2.0 g of toluene, and 0.07 g of 3-mercaptopropionic acid was added. 3.6 g of sulfuric acid was dropwise added, the mixture was stirred at 65° C. for 16 hours. 0.64 g of methanol was added, and after stirring for one hour, 12.0 g of water was added to return to room temperature, and the supernatant was removed. The residue was purified by column chromatography to obtain 5.0 g of a compound (A1).

$^1$H-NMR (300 MHz, DMSO-d6): δ 3.68 ppm (tt, 4H), 3.91 ppm (t, 4H), 4.82 ppm (t, 2H), 6.85 ppm (d, 4H), 7.09 ppm (d, 4H), 7.31-7.52 ppm (m, 5H), 7.85-7.92 ppm (m, 2H), 7.95 ppm (d, 1H), 8.05 ppm (d, 1H), 8.41 ppm (s, 1H)

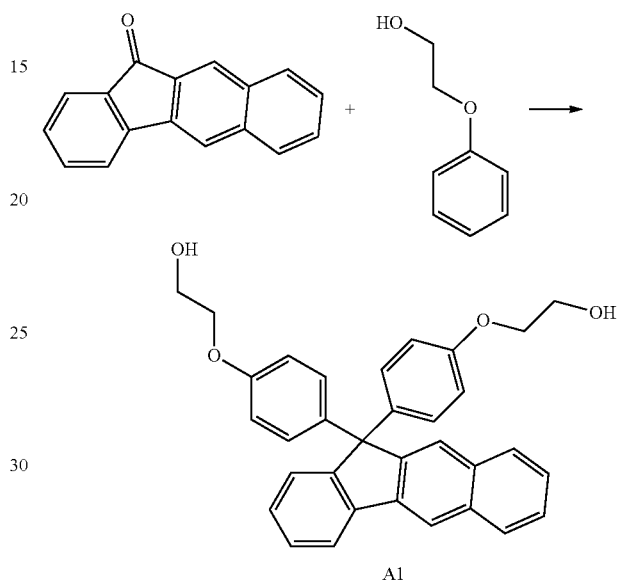

A1

20.8 g (42.5 mmol) of the compound (A1), 6.2 g (42.5 mmol) of isosorbide (ISS), and 68 ml of pyridine were mixed and dissolved at room temperature under a nitrogen stream. After the temperature of the mixture was raised to about 50° C. with stirring, a solution of 12.5 g of triphosgene and 30 g of 1,2-dichloroethane was slowly added dropwise over three hours. At this point, the reaction was carried out by dropwise addition carefully so that the temperature in the reaction system was maintained at 50° C. to 55° C. After the completion of the dropwise addition, the reaction was sufficiently advanced by further stirring for one hour while the temperature in the reaction system was maintained within the above range. After the completion of the reaction, 50 ml of water was slowly added dropwise to decompose unreacted triphosgene. The reaction solution was gently poured into 200 ml of 3.5 mol/L hydrochloric acid water to obtain a solid content. The step of transferring the obtained solid content to 200 ml of methanol and the pulverizing and washing step by using a homomixer was repeated twice, and the solid content was further washed with 300 ml of water. The solid content was dissolved in tetrahydrofuran, and the solution was added to a methanol solvent that was vigorously stirred with a homomixer for reprecipitation. The precipitate was filtered, was washed by applying methanol, and then was dried under a nitrogen atmosphere to obtain 34.0 g of a copolymer (PC-1). The weight average molecular weight of the copolymer (PC-1) was measured and found to be 21,200.

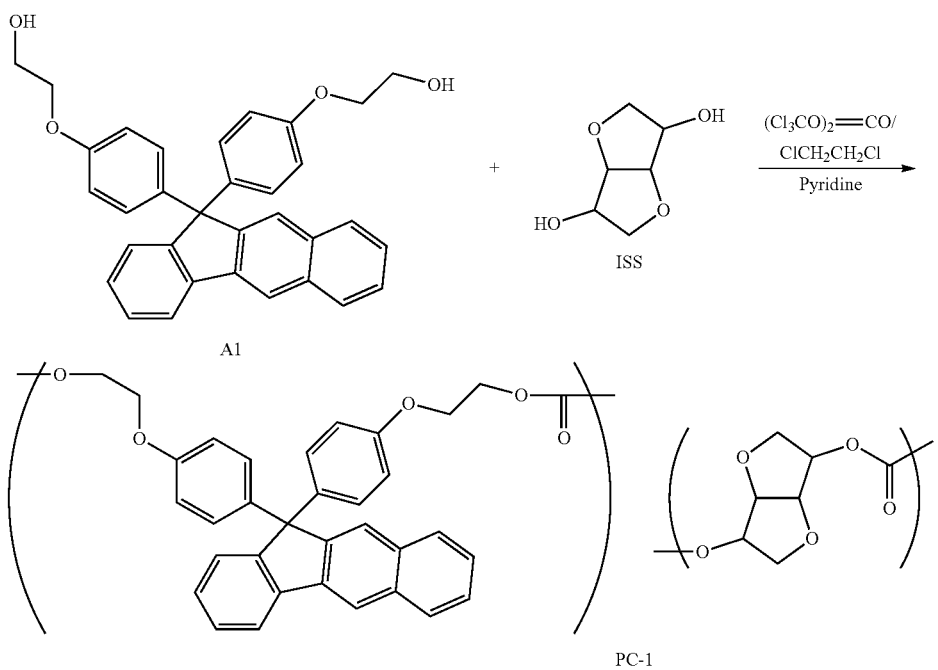

A1

PC-1

Synthesis Example 2

290 g of 5,6-dimethoxy-1-indanone and 204 g of ortho-phthalaldehyde were dissolved in 1,500 mL of methanol. The reaction solution was warmed and maintained at 60° C., and 255 g of potassium hydroxide was dissolved in 1,750 mL of methanol, and the resultant was dropwise added. After being stirred for five hours, the reaction solution was returned to room temperature, and precipitated crystals were collected by filtration to obtain 230 g of a compound A-2A.

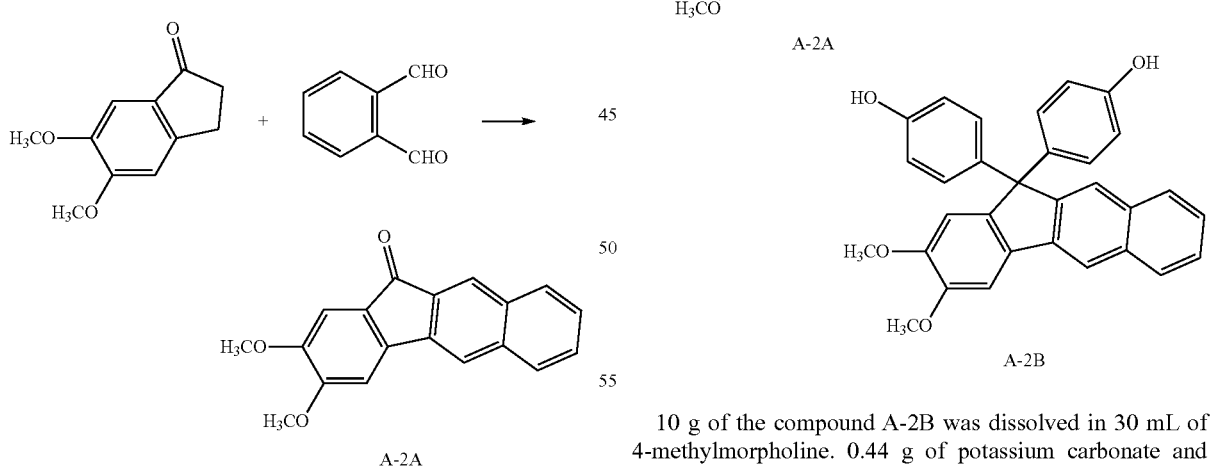

A-2A

A-2B 200 g of the compound A-2A and 320 g of phenol were dissolved in 320 mL of methanesulfonic acid. The reaction solution was warmed and maintained at 60° C., and 3.2 mL of 3-mercaptopropionic acid was dropwise added. After being stirred for five hours, 720 mL of methanol was added dropwise to the reaction solution and was stirred for 30 minutes, 1,400 mL of methanol was further dropwise added. The reaction solution was returned to room temperature, and precipitated crystals were collected by filtration to obtain 292 g of the 10 g of the compound A-2B was dissolved in 30 mL of 4-methylmorpholine. 0.44 g of potassium carbonate and 4.62 g of ethylene carbonate were added and reacted at 120° C. for four hours. After cooling to 60° C., 20 mL of water and 1.7 g of sodium hydroxide were added to the reaction solution, and the mixture was further stirred for 30 minutes. 50 mL of ethyl acetate and 40 mL of 1 N hydrochloric acid were further added to the reaction solution, and the mixture was further stirred for 10 minutes, and then the aqueous layer was removed by liquid separation. The organic layer was washed twice with dilute hydrochloric acid and once with brine, and then the organic layer was dried over magnesium sulfate. Magnesium sulfate was removed by filtration, concentrated with an evaporator, and purified by silica gel column chromatography to obtain 7.5 g of a compound A2.

$^1$H-NMR (300 MHz, DMSO-d6): δ 3.64-3.77 ppm (m, 7H), 3.89-3.96 ppm (m, 7H), 4.84 ppm (t, 2H), 6.85 ppm (d, 4H), 6.91 ppm (s, 1H), 7.10 ppm (d, 4H), 7.38-7.50 ppm (m, 2H), 7.67 ppm (s, 1H), 7.78 ppm (s, 1H), 7.83 ppm (d, 1H), 7.92 ppm (d, 1H), 8.30 ppm (s, 1H)

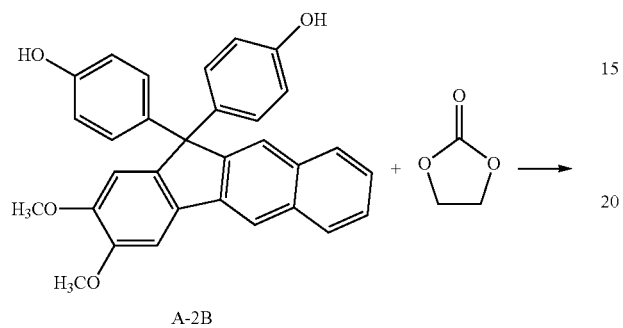

A-2B

A2

A copolymer (PC-2) was obtained in the same manner as in Synthesis Example 1, except that the compound (A1) in Synthesis Example 1 was replaced with an equimolar amount of the compound (A2). The weight average molecular weight of the copolymer (PC-2) was as shown in Table 1.

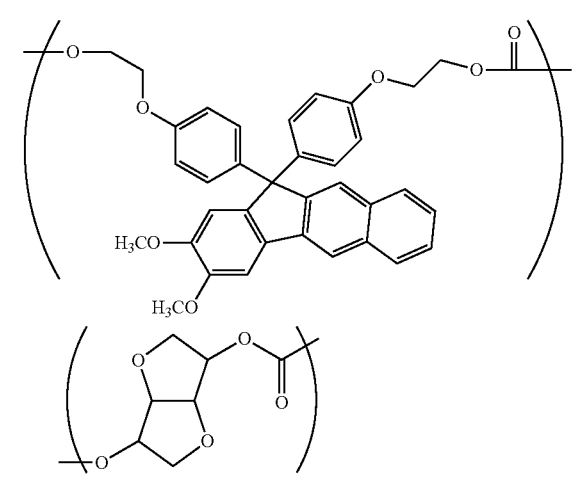

PC-2

Synthesis Example 3

210 g of Compound A3 was obtained by using a synthesis method disclosed in JP2015-193809A.

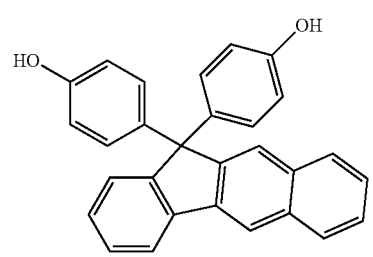

A3

A copolymer (PC-3) was obtained in the same manner as in Synthesis Example 1, except that the compound (A1) in Synthesis Example 1 was replaced with an equimolar amount of the compound (A3). The weight average molecular weight of the copolymer (PC-3) was as shown in Table 1.

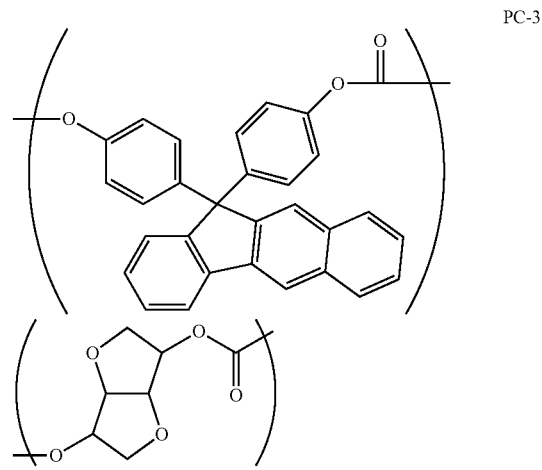

PC-3

Synthesis Example 4

10.0 g (43 mmol) of Compound (A5-1) and 30.0 g (215 mmol) of 2-phenoxyethanol were dissolved in 15 ml of toluene and 12 ml of methanesulfonic acid. The obtained solution was warmed and maintained at 120° C., and 0.16 mL of 3-mercaptopropionic acid was added dropwise. The reaction solution was warmed, was stirred for two hours at 150° C., and then the reaction solution was returned to room temperature. An upper layer of a two-phase separated organic layer was removed, and 200 ml of ethyl acetate and water were added and stirred. Precipitated crystals were collected by filtration and recrystallized in a mixed solvent of ethyl acetate/hexane. 12 g (25 mmol) of the compound (A5) was obtained by filtration. $^1$H-NMR (nuclear magnetic resonance) data of the compound (A5) was as follows.

$^1$H-NMR (300 MHz, DMSO-d6): δ 3.66 ppm (tt, 4H), 3.92 ppm (t, 4H), 4.84 ppm (t, 2H), 6.85 ppm (d, 4H), 7.11 ppm (t, 4H), 7.57-7.70 ppm (m, 3H), 7.76-7.89 ppm (m, 2H), 8.04-8.10 ppm (m, 1H), 8.15-8.25 ppm (m, 2H)

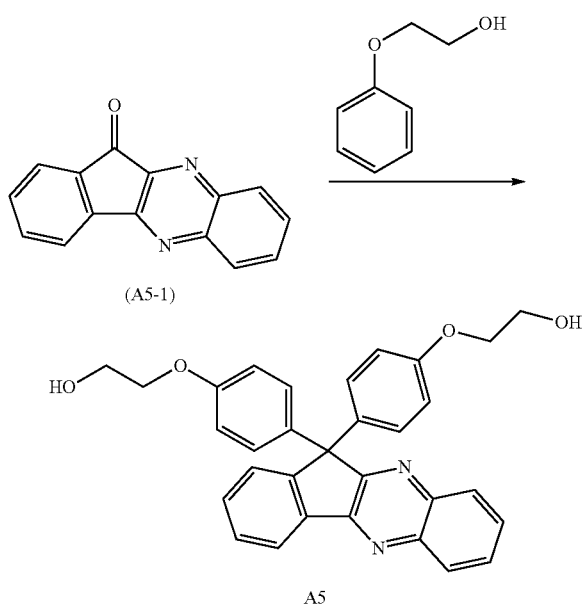

(A5-1)

A5

A copolymer (PC-4) was obtained in the same manner as in Synthesis Example 1, except that the compound (A1) in Synthesis Example 1 was replaced with an equimolar amount of the compound (A5). The weight average molecular weight of the copolymer (PC-4) was as shown in Table 1.

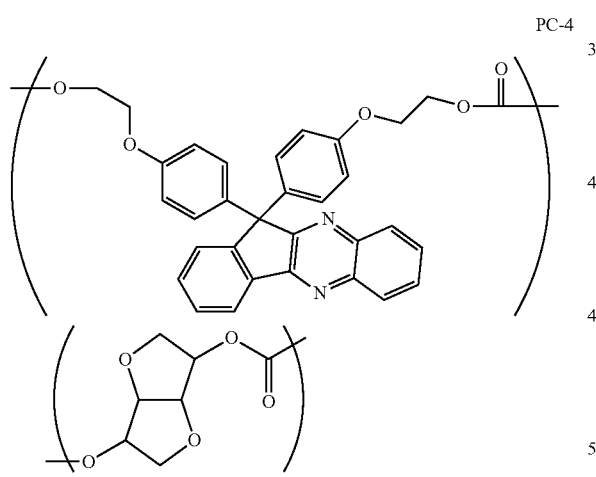

PC-4

Synthesis Example 5

24.9 g (51 mmol) of the compound (A1), 22.7 g (76.5 mmol) of spiroglycol (SPG), and 102 ml of pyridine were mixed and dissolved at room temperature under a nitrogen stream. After the temperature of the mixture was raised to about 50° C. with stirring, a solution of 18.8 g of triphosgene and 45 g of tetrahydrofuran was slowly added dropwise over three hours. At this point, the reaction was carried out by dropwise addition carefully so that the internal temperature of the temperature in the reaction system was maintained at 50° C. to 55° C. After the completion of the dropwise addition, the reaction was sufficiently advanced by further stirring for one hour while the temperature in the reaction system was maintained within the above range. After the completion of the reaction, 75 ml of water was slowly added dropwise to decompose unreacted triphosgene. The reaction solution was gently poured into 300 ml of 3.5 moL/L hydrochloric acid water to obtain a solid content. The step of transferring the obtained solid content to 300 ml of methanol and the pulverizing and washing step by using a homomixer was repeated twice, and the solid content was further washed with 500 ml of water. The solid content was dissolved in tetrahydrofuran, and the solution was added to a methanol solvent that was vigorously stirred with a homomixer for reprecipitation. The precipitate was filtered, was washed by applying methanol to the washed solid content, and then was dried under a nitrogen atmosphere to obtain 43.0 g of a copolymer (PC-5). The weight average molecular weight of the copolymer (PC-5) was as shown in Table 2.

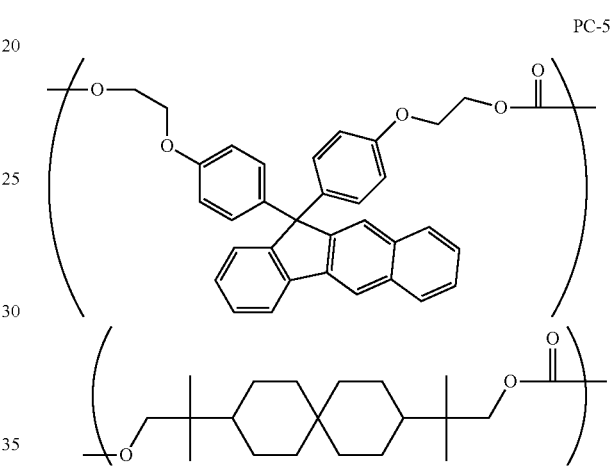

PC-5

Synthesis Example 6

A copolymer (PC-6) was obtained in the same manner as in Synthesis Example 1, except that the compound ISS in Synthesis Example 1 was replaced with an equimolar amount of the compound CHDM. The weight average molecular weight of the copolymer (PC-6) was as shown in Table 2.

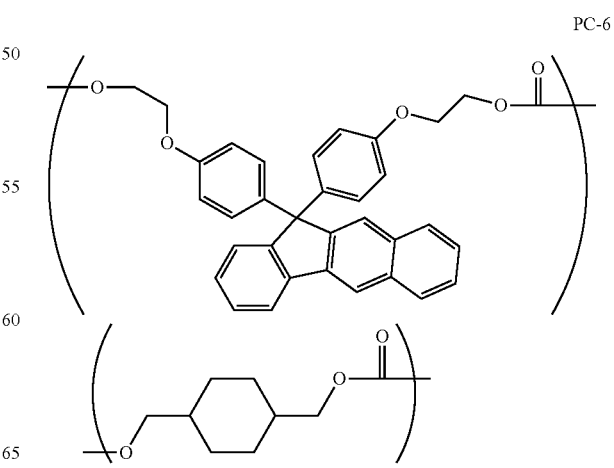

PC-6

Synthesis Example 7

43.6 g (89.2 mmol) of the compound (A1), 8.7 g (38.2 mmol) of bisphenol A (BISA), and 102 ml of pyridine were mixed and dissolved at room temperature under a nitrogen stream. After the temperature of the mixture was raised to about 50° C. with stirring, a solution of 18.8 g of triphosgene and 45 g of tetrahydrofuran was slowly added dropwise over three hours. At this point, the reaction was carried out by dropwise addition carefully so that the internal temperature of the temperature in the reaction system was maintained at 50° C. to 55° C. After the completion of the dropwise addition, the reaction was sufficiently advanced by further stirring for one hour while the temperature in the reaction system was maintained within the above range. After the completion of the reaction, 75 ml of water was slowly added dropwise to decompose unreacted triphosgene. The reaction solution was gently poured into 300 ml of 3.5 mol/L hydrochloric acid water to obtain a solid content. The step of transferring the obtained solid content to 300 ml of methanol and the pulverizing and washing step by using a homomixer was repeated twice, and the solid content was further washed with 500 ml of water. The solid content was dissolved in tetrahydrofuran, and the solution was added to a methanol solvent that was vigorously stirred with a homomixer for reprecipitation. The precipitate was filtered, was washed by applying methanol to the washed solid content, and then was dried under a nitrogen atmosphere to obtain 45.2 g of a copolymer (PC-7). The weight average molecular weight of the copolymer (PC-7) was as shown in Table 2.

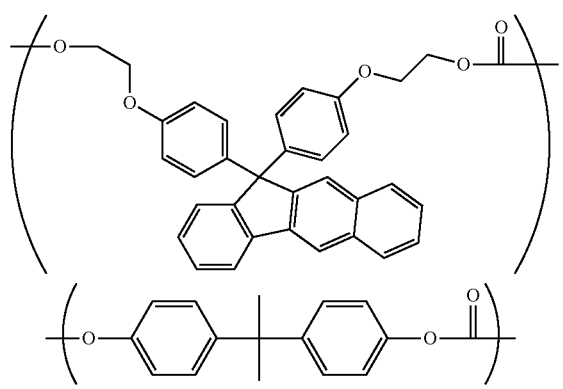

PC-7

Synthesis Example 8

16.6 g (34 mmol) of the compound (A1), 7.4 g (51 mmol) of isosorbide (ISS), and 68 ml of pyridine were mixed and dissolved at room temperature under a nitrogen stream. After the temperature of the mixture was raised to about 50° C. with stirring, a solution of 12.5 g of triphosgene and 30 g of 1,2-dichloroethane was slowly added dropwise over three hours. At this point, the reaction was carried out by dropwise addition carefully so that the internal temperature of the temperature in the reaction system was maintained at 50° C. to 55° C. After the completion of the dropwise addition, the reaction was sufficiently advanced by further stirring for one hour while the temperature in the reaction system was maintained within the above range. After the completion of the reaction, 50 ml of water was slowly added dropwise to decompose unreacted triphosgene. The reaction solution was gently poured into 200 ml of 3.5 mol/L hydrochloric acid water to obtain a solid content. The step of transferring the obtained solid content to 200 ml of methanol and the pulverizing and washing step by using a homomixer was repeated twice, and the solid content was further washed with 300 ml of water. The solid content was dissolved in tetrahydrofuran, and the solution was added to a methanol solvent that was vigorously stirred with a homomixer for reprecipitation. The precipitate was filtered, was washed by applying methanol to the washed solid content, and then was dried under a nitrogen atmosphere to obtain 21.0 g of a copolymer (PC-8). The weight average molecular weight of the copolymer (PC-8) was as shown in Table 3.

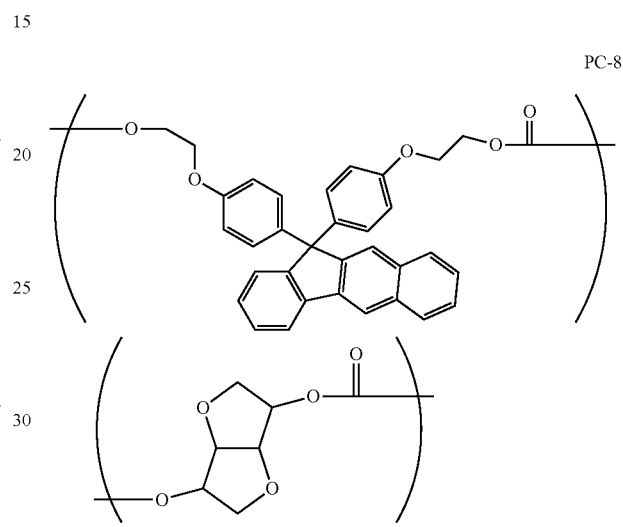

PC-8

Synthesis Example 9

13.8 g (28.1 mmol) of the compound (A5), 8.3 g (57.0 mmol) of isosorbide (ISS), and 68 ml of pyridine were mixed and dissolved at room temperature under a nitrogen stream. After the temperature of the mixture was raised to about 50° C. with stirring, a solution of 12.5 g of triphosgene and 30 g of 1,2-dichloroethane was slowly added dropwise over three hours. At this point, the reaction was carried out by dropwise addition carefully so that the internal temperature of the temperature in the reaction system was maintained at 50° C. to 55° C. After the completion of the dropwise addition, the reaction was sufficiently advanced by further stirring for one hour while the temperature in the reaction system was maintained within the above range. After the completion of the reaction, 50 ml of water was slowly added dropwise to decompose unreacted triphosgene. The reaction solution was gently poured into 200 ml of 3.5 mol/L hydrochloric acid water to obtain a solid content. The step of transferring the obtained solid content to 200 ml of methanol and the pulverizing and washing step by using a homomixer was repeated twice, and the solid content was further slurry washed with 300 ml of water. The solid content was dissolved in tetrahydrofuran, and the solution was added to a methanol solvent that was vigorously stirred with a homomixer for reprecipitation. The precipitate was filtered, was washed by applying methanol to the washed solid content, and then was dried under a nitrogen atmosphere to obtain 20.5 g of a copolymer (PC-9). The weight average molecular weight of the copolymer (PC-9) was as shown in Table 3.

PC-9

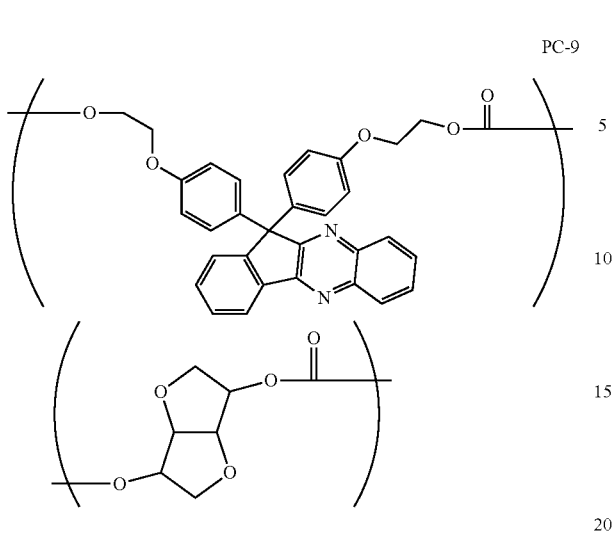

Synthesis Example 10

8.3 g (17.0 mmol) of the compound (A1), 7.0 g (12.8 mmol) of the compound (A2), 8.1 g (55.3 mmol) of isosorbide (ISS), and 68 ml of pyridine were mixed and dissolved at room temperature under a nitrogen stream. After the temperature of the mixture was raised to about 50° C. with stirring, a solution of 12.5 g of triphosgene and 30 g of 1,2-dichloroethane was slowly added dropwise over three hours. At this point, the reaction was carried out by dropwise addition carefully so that the internal temperature of the temperature in the reaction system was maintained at 50° C. to 55° C. After the completion of the dropwise addition, the reaction was sufficiently advanced by further stirring for one hour while the temperature in the reaction system was maintained within the above range. After the completion of the reaction, 50 ml of water was slowly added dropwise to decompose unreacted triphosgene. The reaction solution was gently poured into 200 ml of 3.5 mol/L hydrochloric acid water to obtain a solid content. The step of transferring the obtained solid content to 200 ml of methanol and the pulverizing and washing step by using a homomixer was repeated twice, and the solid content was further washed with 300 ml of water. The solid content was dissolved in tetrahydrofuran, and the solution was added to a methanol solvent that was vigorously stirred with a homomixer for reprecipitation. The precipitate was filtered, was washed by applying methanol to the washed solid content, and then was dried under a nitrogen atmosphere to obtain 22.0 g of a copolymer (PC-10). The weight average molecular weight of the copolymer (PC-10) was as shown in Table 3.

PC-10

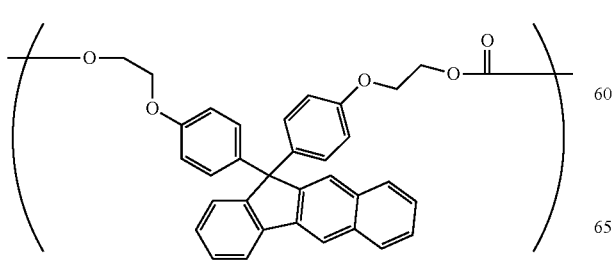

-continued

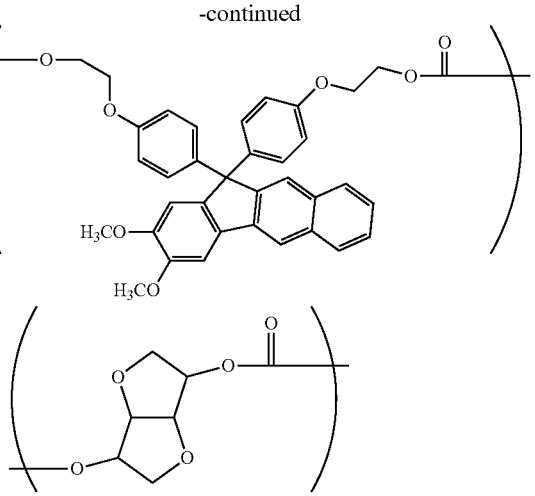

Comparative Synthesis Example 1

As the compound (A7), cas117344-32-8 manufactured by FUJIFILM Wako Pure Chemical Corporation was used.

A7

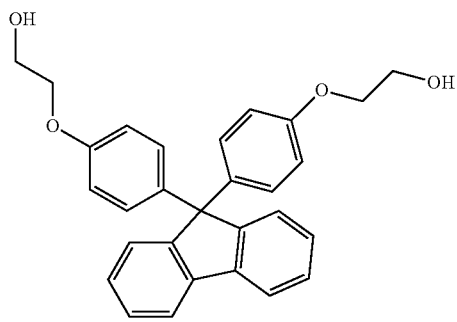

A copolymer (PCR-1) was obtained in the same manner as in Synthesis Example 1, except that the compound (A1) in Synthesis Example 1 was replaced with an equimolar amount of the compound (A7). The weight average molecular weight of the copolymer (PCR-1) was as shown in Table 1.

PCR-1

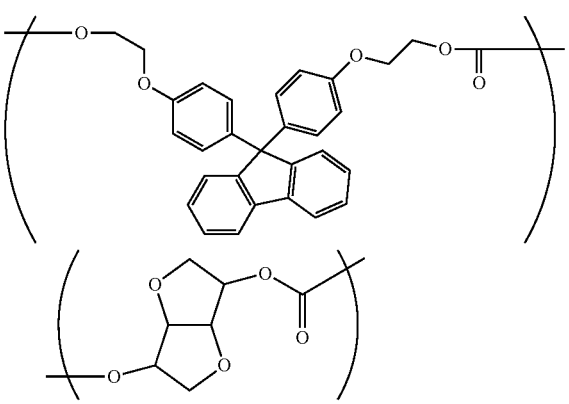

Comparative Synthesis Example 2

A copolymer (PCR-2) was obtained in the same manner as in Synthesis Example 5, except that the compound (A1) in Synthesis Example 5 was replaced with an equimolar amount of the compound (A7). The weight average molecular weight of the copolymer (PCR-2) was as shown in Table 2.

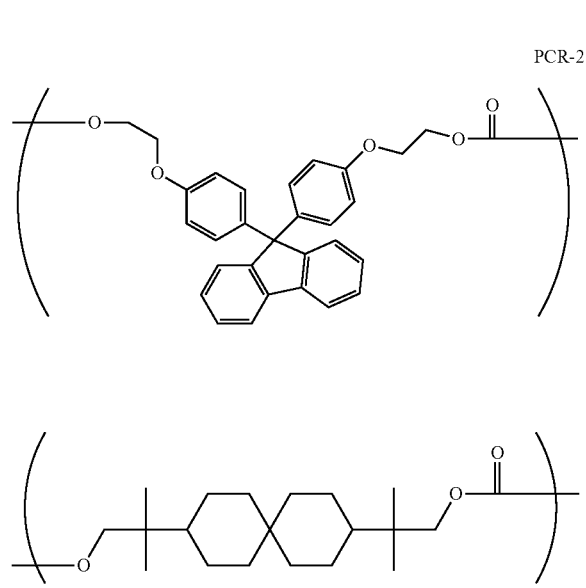

Comparative Synthesis Example 3

A copolymer (PCR-3) was obtained in the same manner as in Synthesis Example 6, except that the compound (A1) in Synthesis Example 6 was replaced with an equimolar amount of the compound (A7). The weight average molecular weight of the copolymer (PCR-3) was as shown in Table 2.

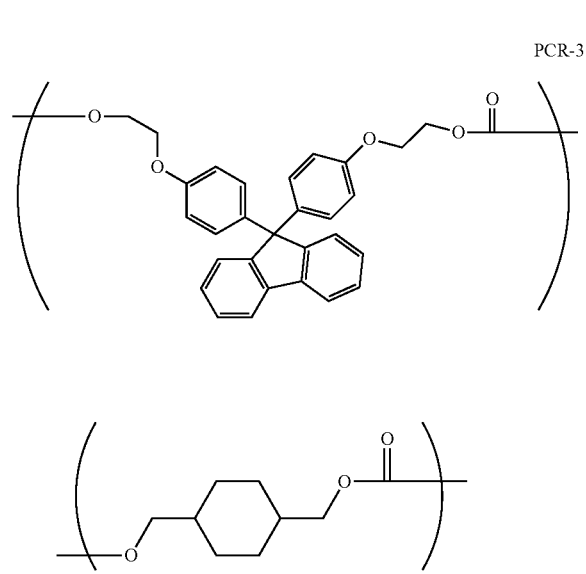

Comparative Synthesis Example 4

A copolymer (PCR-4) was obtained in the same manner as in Synthesis Example 7, except that the compound (A1) in Synthesis Example 7 was replaced with an equimolar amount of the compound (A7). The weight average molecular weight of the copolymer (PCR-4) was as shown in Table 2.

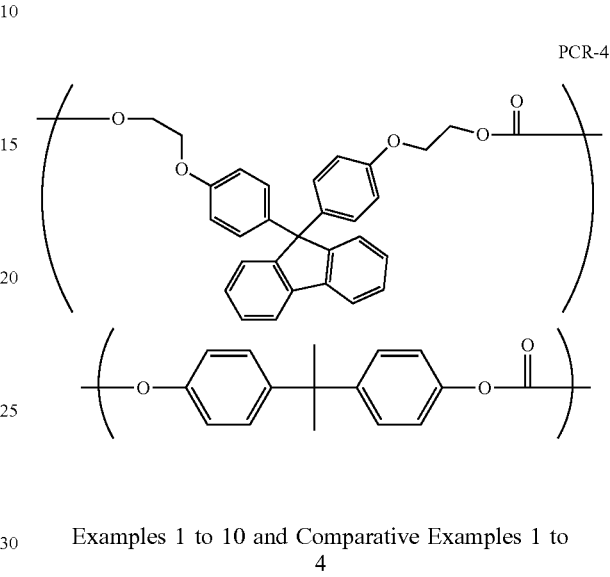

Examples 1 to 10 and Comparative Examples 1 to 4

The copolymers (PC-1) to (PC-10) and (PCR-1) to (PCR-4) obtained in Synthesis Examples 1 to 10 and Comparative Synthesis Examples 1 to 4 were dissolved in methylene chloride, respectively, to manufacture dope solutions. A cast film was manufactured by a well-known method using this dope solution. The obtained film was cut into a size of 100 mm×70 mm and used as a sample, and the sample was stretched 2.0 times at 190° C. In this manner, the phase difference films of Examples 1 to 10 and Comparative Examples 1 to 4 were obtained.

(Measurement)

<In-Plane Retardation (Re)>

The phase differences of the phase difference films obtained in examples and comparative examples were measured with an ellipsometer (manufactured by JASCO Corporation, M150), and a ratio (Re (446/548)) of the in-plane retardation (Re (446)) at 446 nm and the in-plane retardation (Re (548)) at 548 nm and a ratio (Re (629/548)) of the in-plane retardation (Re (629)) at 629 nm and the in-plane retardation (Re (548)) at 550 nm was calculated.

<Photoelastic Coefficient>

The phase difference films obtained in the examples and the comparative examples were cut into a size of 3.5 cm×12 cm, and the in-plane retardation (Re) at each load of 250 g, 500 g, 1,000 g, and 1,500 g without a load was measured using an ellipsometer (JASCO Corporation, M150), and the photoelastic coefficient was calculated from the slope of the straight line of the Re change with respect to the stress.

TABLE 1

| | | Negative monomer component (mol %) | | | | | Positive monomer component (mol %) | Weight average molecular weight | Reciprocal wavelength dispersibility | | Phase difference | Photoelastic coefficient |
|---|---|---|---|---|---|---|---|---|---|---|---|---|
| | | A1 | A2 | A3 | A5 | A7 | ISS | | Re (446/548) | Re (629/548) | Re (548) | $[10^{-12}/Pa]$ |
| Example 1 | PC-1 | 50 | | | | | 50 | 21200 | 0.74 | 1.08 | 119 | 23 |
| Example 2 | PC-2 | | 50 | | | | 50 | 19800 | 0.72 | 1.09 | 108 | 28 |
| Example 3 | PC-3 | | | 50 | | | 50 | 21000 | 0.73 | 1.08 | 111 | 26 |
| Example 4 | PC-4 | | | | 50 | | 50 | 19500 | 0.72 | 1.10 | 102 | 27 |
| Comparative Example 1 | PCR-1 | | | | | 50 | 50 | 19000 | 0.84 | 1.05 | 140 | 23 |

TABLE 2

| | | Negative monomer component (mol %) | | Positive monomer component (mol %) | | | Weight average molecular weight | Reciprocal wavelength dispersibility | | Phase difference | Photoelastic coefficient |
|---|---|---|---|---|---|---|---|---|---|---|---|
| | | A1 | A7 | SPG | CHDM | BISA | | Re (446/548) | Re (629/548) | Re (548) | $[10^{-12}/Pa]$ |
| Example 5 | PC-5 | 40 | | 60 | | | 31500 | 0.79 | 1.06 | 121 | 22 |
| Comparative Example 2 | PCR-2 | | 40 | 60 | | | 28400 | 0.82 | 1.05 | 142 | 21 |
| Example 6 | PC-6 | 50 | | | 50 | | 28600 | 0.78 | 1.06 | 118 | 2.4 |
| Comparative Example 3 | PCR-3 | | 50 | | 50 | | 25500 | 0.79 | 1.05 | 139 | 22 |
| Example 7 | PC-7 | 70 | | | | 30 | 18900 | 0.80 | 1.06 | 102 | 30 |
| Comparative Example 4 | PCR-4 | | 70 | | | 30 | 21500 | 0.81 | 1.06 | 135 | 36 |

TABLE 3

| | | Negative monomer component (mol %) | | | | Positive monomer component (mol %) | Weight average molecular weight | Reciprocal wavelength dispersibility | | Phase difference | Photoelastic coefficient |
|---|---|---|---|---|---|---|---|---|---|---|---|
| | | A1 | A2 | A5 | A7 | ISS | | Re (446/548) | Re (629/548) | Re (548) | $[10^{-12}/Pa]$ |
| Example 8 | PC-8 | 40 | | | | 60 | 17200 | 0.78 | 1.06 | 138 | 21 |
| Example 9 | PC-9 | | 33 | | | 67 | 15900 | 0.80 | 1.05 | 139 | 26 |
| Example 10 | PC-10 | 20 | 15 | | | 65 | 18900 | 0.82 | 1.06 | 145 | 22 |
| Comparative Example 1 | PCR-1 | | | | 50 | 50 | 19000 | 0.84 | 1.05 | 140 | 23 |

The reciprocal wavelength dispersibility of the phase difference film was larger as the value of Re (446/548) is smaller and the value of Re (629/548) is larger. The phase difference films of Examples 1 to 4 had larger reciprocal wavelength dispersibility than the phase difference film of Comparative Example 1.

Comparing Example 5 and Comparative Example 2 in Table 2, Example 6 and Comparative Example 3 in Table 2, Example 7 and Comparative Example 4 in Table 2, the negative monomer components used in the examples had a greater effect of making the reciprocal wavelength dispersion of Re compared with the negative monomer component (the compound A7) used in comparative examples and and a greater effect of making Re negative. Therefore, it is possible to suppress the amount of the negative monomer component necessary for developing desired reciprocal wavelength dispersibility and phase difference Re (548) (for example, 137.5 nm). This means that the composition ratio of the positive monomer component, which is more generally used than the negative monomer component, can be increased.

The photoelastic coefficient of the phase difference film obtained in the examples was $40 \times 10^{-12}$/Pa or less, which was preferable as a phase difference film.

What is claimed is:

1. A phase difference film comprising: a copolymer containing at least one selected from a nit represented by Formula (1) and a unit represented by Formula (2), and a unit represented by Formula (3),
wherein 20 nm<Re (548)<300 nm,
0.5<Re (446)/Re (548)<1.0, and
1.0<Re (629)/Re (548)<2.0;
where, Re (446), Re (548), and Re (629) represent in-plane retardation at respective wavelengths of 446 nm, 548 nm, and 629 nm;

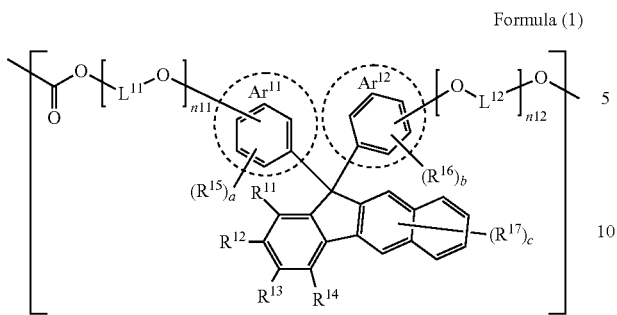

Formula (1)

in Formula (1), $R^{11}$ to $R^{14}$ each independently represent a hydrogen atom or a substituent having a Hammett substituent constant $\sigma_p$ value of less than −0.15, except for an aryl group, a heteroaryl group, and a substituent having a reactive group, and in $R^{11}$ to $R^{14}$, substituents adjacent to each other are not bonded to each other to form a fused ring;

$R^{15}$ to $R^{17}$ each independently represent a substituent;

a to c each independently represent an integer of 0 or more and represent an integer of equal to or less than the maximum number of substitution on each ring; in a case where a to c each are an integer of 2 or more, a plurality of $R^{15}$'s, a plurality of $R^{16}$'s, and a plurality of $R^{17}$'s may be identical to or different from each other;

$Ar^{11}$ and $Ar^{12}$ each independently represent an aryl group including a benzene ring surrounded by a broken line or a heteroaryl group including a benzene ring surrounded by a broken line;

$L^{11}$ and $L^{12}$ each independently represent an alkylene group having 2 to 8 carbon atoms, a cycloalkylene group having 5 to 12 carbon atoms, an arylene group having 6 to 20 carbon atoms; or a heteroarylene group having 6 to 20 carbon atoms;

n11 and n12 each independently represent an integer of 0 to 10; in a case where n11 and n12 are an integer of 2 to 10, a plurality of $L^{11}$'s and a plurality of $L^{12}$'s may be identical to or different: from each other;

in a case where $Ar^{11}$ and $Ar^{12}$ each independently represent an aromatic fused ring group including a benzene ring surrounded by a broken line, $R^{15}$, $R^{16}$, —O—[$L^{11}$-O]$_{n11}$-, and [O-$L^{12}$]$_{n12}$—O— each independently may be substituted at the benzene ring surrounded by a broken line and may be substituted at a ring included in a fused ring other than the benzene ring surrounded by a broken line;

in Formula (2), $Y^{21}$ and $Y^{22}$ each independently represent a carbon atom, an oxygen atom, a sulfur atom, or a nitrogen atom, and at least one $Y^{21}$ or $Y^{22}$ is an oxygen atom, a sulfur atom, or a nitrogen atom;

Z is an atomic group that forms a 5-membered to 7-membered ring with $Y^{21}$—C=C—$Y^{22}$, in which ring-constituting atoms of the atomic group includes a carbon atom, an oxygen atom, a sulfur atom, or a nitrogen atom;

$R^{21}$ to $R^{24}$ each independently represent a substituent;

p to s each independently represent an integer of 0 or more and represent an integer of equal to or less than the maximum number of substitution on each ring; in a case where p to s each are an integer of 2 or more, a plurality of $R^{21}$'s, a plurality of $R^{22}$'s, a plurality of $R^{23}$'s, and a plurality of $R^{24}$'s may be identical to or different from each other;

$Ar^{21}$ and $Ar^{22}$ each independently represent an aryl group including a benzene ring surrounded by a broken line or a heteroaryl group including a benzene ring surrounded by a broken line;

$X^{21}$ and $X^{22}$ each independently is a group selected from a single bond, —O—, and —S—;

$L^{21}$ and $L^{22}$ each independently represent an alkylene group having 2 to 8 carbon atoms, a cycloalkylene group having 5 to 12 carbon atoms, an arylene group having 6 to 20 carbon atoms, or a heteroarylene group having 6 to 20 carbon atoms;

m21 and m22 each independently represent an integer of 0 to 0.10; in a case where m21 and m22 each are an integer of 2 to 10, a plurality of -[$L^{21}$-$X^{21}$]-'s and a plurality of —[$X^{22}$-$L^{22}$]-'s may be identical to or different from each other;

in a case where $Ar^{21}$ and $Ar^{22}$ are each independently an aromatic fused ring group including a benzene ring surrounded by a broken line, $R^{21}$, $R^{22}$, —O-[$L^{21}$-$X^{21}$]$_{m2}$—, and —[$X^{22}$-$L^{22}$]$_{m22}$-O— may be each independently substituted at the benzene ring surrounded by a broken line or may be substituted at a ring included in a fused ring other than the benzene ring surrounded by a broken line; and

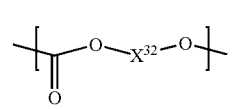

Formula (3)

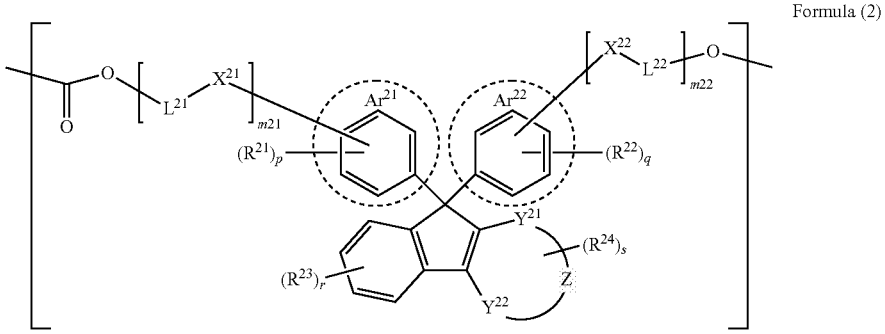

Formula (2)

in Formula (3), $X^{32}$ represents an alkylene group having 2 to 20 carbon atoms, a cycloalkylene group having 4 to 20 carbon atoms, an arylene group having 6 to 20 carbon atoms, or a group obtained by a combination thereof; where, ring-constituting atoms of the cycloalkylene group may be substituted with an oxygen atom, a sulfur atom, or a nitrogen atom.

2. The phase difference film according to claim 1, wherein the unit represented by Formula (1) is a unit represented by Formula (11);

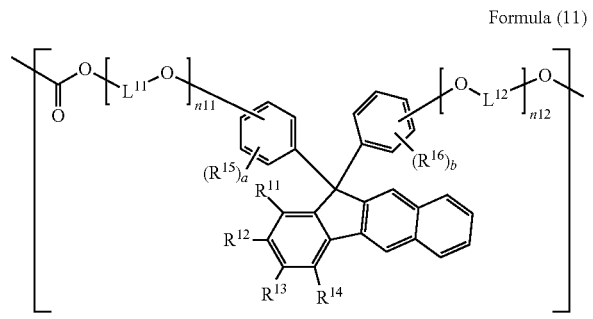

Formula (11)

in Formula (11), $R^{11}$ to $R^{14}$ each independently represent a hydrogen atom or a substituent having a Hammett substituent constant $\sigma_p$ value of less than –0.15, except for an aryl group, a heteroaryl group, and a substituent having a reactive group, and in $R^{11}$ to $R^{14}$, substituents adjacent to each other are not bonded to each other to form a fused ring;

$R^{15}$ and $R^{16}$ each independently represent a methyl group or an ethyl group;

a and b each independently represent an integer of 0 to 2;

$L^{11}$ and $L^{12}$ each independently represent an ethylene group or a propylene group; and n11 and n12 each independently represent an integer of 0 to 3.

3. The phase difference film according to claim 1, wherein the unit represented by Formula (2) is a unit represented by Formula (21);

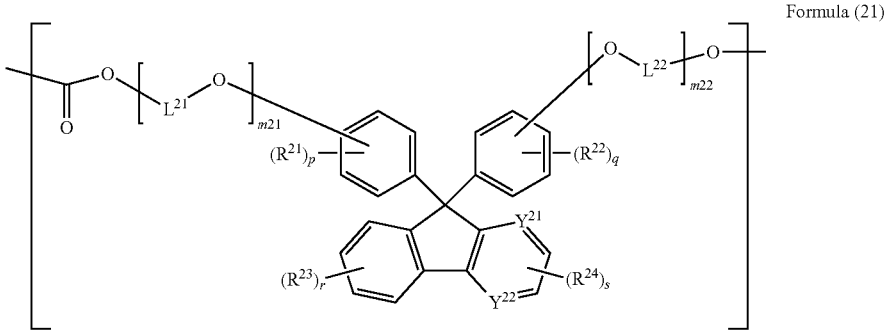

Formula (21)

in Formula (21), $Y^{21}$ and $Y^{22}$ each independently represent a carbon atom or a nitrogen atom, and at least one of $Y^{21}$ and $Y^{22}$ is a nitrogen atom;

$R^{21}$ and $R^{22}$ each independently represent a methyl group or an ethyl group, and $R^{23}$ and $R^{24}$ each independently represent a substituent;

p and q each independently represent an integer of 0 to 3, r represents an integer of 0 to 4, s represents an integer of 0 to 2, and in a case where s is 2, the substituent represented by $R^{24}$ may be bonded to each other to form a fused ring;

$L^{21}$ and $L^{22}$ each independently represent an ethylene group or a propylene group; and m21 and m22 each independently represent an integer of 0 to 3.

4. The phase difference film according to claim 3, wherein in Formula (21), $Y^{21}$ and $Y^{22}$ are nitrogen atoms.

5. The phase difference film according to claim 1, wherein, in Formula (3), $X^{32}$ represents an alkylene group having 5 to 20 carbon atoms having at least one selected from an alicyclic ring, a heterocyclic ring, and an aromatic ring as a substituent, a cycloalkylene group having 4 to 20 carbon atoms, an arylene group having 6 to 20 carbon atoms, or a group obtained by a combination thereof, where ring-constituting atoms of the cycloalkylene group may be substituted with an oxygen atom, a sulfur atom, or a nitrogen atom.

6. The phase difference film according to claim 1, wherein the unit represented by Formula (3) is a unit selected by the following constitutional units;

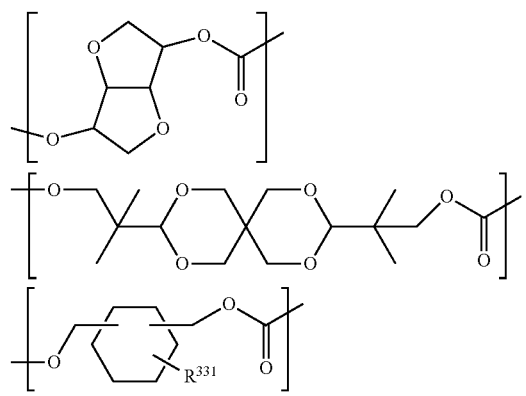

-continued

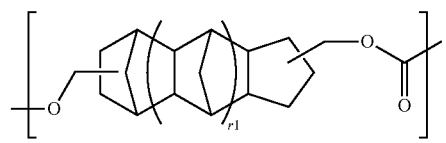

-continued

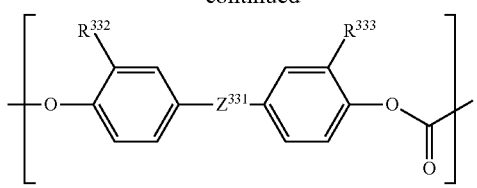

in the constitutional units, $R^{331}$ represents a hydrogen atom or an alkyl group having 1 to 12 carbon atoms; r1 is 0 or 1; $R^{332}$ and $R^{333}$ each independently represent a hydrogen atom or a methyl group, and $Z^{331}$ represents a linking group represented by any of the following structural formulae; and

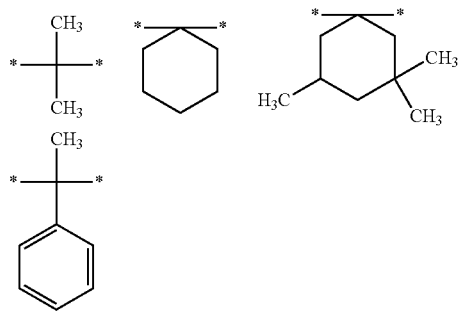

in the above structural formula, * represents a linking position.

7. The phase difference film according to claim 1, a photoelastic coefficient is 0 cm²/N to 40×10⁻⁸ cm²/N.

* * * * *